US012782514B2

(12) United States Patent
Boloorian

(10) Patent No.: US 12,782,514 B2
(45) Date of Patent: Nov. 3, 2026

(54) DATA RESOLUTION IN LIDAR SYSTEMS

(71) Applicant: SiLC Technologies, Inc., Monrovia, CA (US)

(72) Inventor: Majid Boloorian, San Diego, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 841 days.

(21) Appl. No.: 18/119,274

(22) Filed: Mar. 8, 2023

(65) Prior Publication Data

US 2024/0302497 A1 Sep. 12, 2024

(51) Int. Cl.

*G01C 3/08* (2006.01)
*G01S 7/48* (2006.01)
*G01S 7/481* (2006.01)
*G01S 17/08* (2006.01)
*G01S 17/58* (2006.01)

(52) U.S. Cl.

CPC .......... *G01S 7/4808* (2013.01); *G01S 7/4817* (2013.01); *G01S 17/08* (2013.01); *G01S 17/58* (2013.01)

(58) Field of Classification Search

CPC ...... G01S 7/4808; G01S 7/4817; G01S 17/08; G01S 17/58

See application file for complete search history.

(56) References Cited

U.S. PATENT DOCUMENTS 4,168,906 A 9/1979 Schwiesow
4,262,993 A 4/1981 Burns et al.
4,472,020 A 9/1984 Evanchuk
(Continued)

FOREIGN PATENT DOCUMENTS

CA 3191688 A 3/2022
CN 1668939 A 9/2005
(Continued)

OTHER PUBLICATIONS

Rodriquez, Kari, International Search Report and Written Opinion, PCT/US2024/018273, Internationl Search Authority, United States Patent and Trademark Office, Jun. 27, 2024.

(Continued)

*Primary Examiner* — Mark Hellner

(74) *Attorney, Agent, or Firm* — Gavrilovich, Dodd & Lindsey LLP

(57) ABSTRACT

Operating the LIDAR system includes transmitting a system output signal from the LIDAR system such that a sample region is illuminated by the system output signal. Different portions of the system output signal are transmitted during different data periods. The method also includes combining light that returns to the LIDAR system from the system output signal with light from a reference signal so as to generate beating signals that are each associated with a different one of the data periods. A set of multiple candidate frequencies is generated for each of the data periods. Each of the candidate frequencies for a data period represents a possible beat frequency for the beating signal associated with the data period. The method further includes using the candidate frequencies for a check one of the data periods to identify which of the candidate frequencies for a subject one of the data periods is the beat frequency for the beating signal associated with the subject data period.

18 Claims, 8 Drawing Sheets

(56) References Cited

U.S. PATENT DOCUMENTS

| | | | |
|---|---|---|---|
| 4,523,803 A | 6/1985 | Arao et al. | |
| 4,721,385 A | 1/1988 | Jelalian et al. | |
| 4,786,132 A | 11/1988 | Gordon | |
| 4,845,703 A | 7/1989 | Suzuki | |
| 4,914,665 A | 4/1990 | Sorin | |
| 4,955,028 A | 9/1990 | Alfeness et al. | |
| 4,987,832 A | 1/1991 | Klink et al. | |
| 4,995,720 A | 2/1991 | Amzajerdian | |
| 5,041,832 A | 8/1991 | Gulczynski | |
| 5,194,906 A | 3/1993 | Kimura et al. | |
| 5,289,252 A | 2/1994 | Nourrcier | |
| 5,305,412 A | 4/1994 | Paoli | |
| 5,323,223 A | 6/1994 | Hayes | |
| 5,396,328 A | 3/1995 | Jestel et al. | |
| 5,500,910 A | 3/1996 | Boudreau et al. | |
| 5,847,816 A | 12/1998 | Zediker et al. | |
| 5,889,490 A | 3/1999 | Wachter et al. | |
| 5,953,468 A | 9/1999 | Finnila et al. | |
| 5,977,538 A | 11/1999 | Unger et al. | |
| 5,995,810 A | 11/1999 | Karasawa | |
| 6,035,083 A | 3/2000 | Brennan et al. | |
| 6,040,898 A | 3/2000 | Mrosik et al. | |
| 6,108,472 A | 8/2000 | Rickman et al. | |
| 6,285,288 B1 | 9/2001 | Langdon et al. | |
| 6,400,500 B1 | 6/2002 | Tidmarsh et al. | |
| 6,480,513 B1 | 11/2002 | Kapany et al. | |
| 6,556,759 B2 | 4/2003 | Roberts et al. | |
| 6,567,573 B1 | 5/2003 | Domash et al. | |
| 6,687,010 B1 | 2/2004 | Horri et al. | |
| 6,921,490 B1 | 7/2005 | Qian et al. | |
| 6,959,133 B2 | 10/2005 | Vancoill et al. | |
| 6,970,621 B1 | 11/2005 | Fried | |
| 6,977,502 B1 | 12/2005 | Hertz | |
| 7,345,744 B2 | 3/2008 | Halmos et al. | |
| 7,375,877 B1 | 5/2008 | Di Teodoro et al. | |
| 7,535,390 B2 | 5/2009 | Hsu | |
| 7,907,333 B2 | 3/2011 | Coyle | |
| 8,165,433 B2 | 4/2012 | Jenkins et al. | |
| 8,213,751 B1 | 7/2012 | Ho et al. | |
| 8,311,374 B2 | 11/2012 | Hochberg et al. | |
| 8,326,100 B2 | 12/2012 | Chen et al. | |
| 8,410,566 B2 | 4/2013 | Qian et al. | |
| 8,541,744 B1 | 9/2013 | Liu | |
| 8,558,993 B2 | 10/2013 | Newbury et al. | |
| 8,885,678 B1 | 11/2014 | Kupershmidt | |
| 9,157,790 B2 | 10/2015 | Shpunt et al. | |
| 9,176,282 B2 | 11/2015 | Pottier et al. | |
| 9,217,831 B1 | 12/2015 | Asghari | |
| 9,235,097 B2 | 1/2016 | Meade et al. | |
| 9,270,078 B2 | 2/2016 | Rickman et al. | |
| 9,310,471 B2 | 4/2016 | Sayyah et al. | |
| 9,310,487 B2 | 4/2016 | Sakimura et al. | |
| 9,519,052 B2 | 12/2016 | Gusev | |
| 9,551,832 B1 | 1/2017 | Bovington et al. | |
| 9,575,341 B2 | 2/2017 | Heck et al. | |
| 9,606,234 B2 | 3/2017 | Major, Jr. et al. | |
| 9,625,580 B2 | 4/2017 | Kotelnikov et al. | |
| 9,735,885 B1 | 8/2017 | Sayyah et al. | |
| 9,740,079 B1 | 8/2017 | Davids et al. | |
| 9,748,726 B1 | 8/2017 | Morton et al. | |
| 9,753,351 B2 | 9/2017 | Eldada | |
| 9,778,363 B2 | 10/2017 | Kadambi et al. | |
| 9,798,166 B1 | 10/2017 | Sharma et al. | |
| 9,823,118 B2 | 11/2017 | Doylend et al. | |
| 9,841,495 B2 | 12/2017 | Campbell et al. | |
| 9,851,443 B2 | 12/2017 | Chen | |
| 9,857,468 B1 | 1/2018 | Eichenholz et al. | |
| 9,893,737 B1 | 2/2018 | Keramat et al. | |
| 10,003,168 B1 | 6/2018 | Villeneuve | |
| 10,007,060 B1 | 6/2018 | Qian et al. | |
| 10,094,916 B1 | 10/2018 | Droz et al. | |
| 10,137,903 B2 | 11/2018 | Tascione et al. | |
| 10,222,474 B1 | 3/2019 | Raring et al. | |
| 10,274,599 B2 | 4/2019 | Schmalenberg | |
| 10,281,322 B2 | 5/2019 | Doylend et al. | |
| 10,345,447 B1 | 7/2019 | Hicks | |
| 10,345,497 B2 | 7/2019 | Wu et al. | |
| 10,397,019 B2 | 8/2019 | Hartung et al. | |
| 10,564,268 B2 | 2/2020 | Turbide et al. | |
| 10,605,901 B2 | 3/2020 | Lee et al. | |
| 10,627,496 B2 | 4/2020 | Schmalenberg et al. | |
| 10,649,306 B2 | 5/2020 | Skirlo et al. | |
| 10,739,256 B1 | 8/2020 | Rickman et al. | |
| 10,761,195 B2 | 9/2020 | Donovan | |
| 10,782,782 B1 | 9/2020 | DeSalvo et al. | |
| 10,788,582 B2 | 9/2020 | Feng et al. | |
| 10,816,649 B1 | 10/2020 | Keyser et al. | |
| 10,845,480 B1 | 11/2020 | Shah et al. | |
| 10,901,074 B1 | 1/2021 | Pan et al. | |
| 10,962,713 B2 | 3/2021 | Lee | |
| 11,022,683 B1 | 6/2021 | Rezk | |
| 11,067,668 B1 | 7/2021 | Bravo | |
| 11,114,815 B1 | 9/2021 | Chen et al. | |
| 11,119,219 B1 | 9/2021 | LaChapelle et al. | |
| 11,162,789 B2 | 11/2021 | Lodin et al. | |
| 11,170,476 B1 | 11/2021 | Toshiwal et al. | |
| 11,175,388 B1 | 11/2021 | Wood et al. | |
| 11,221,404 B1 | 1/2022 | DeSalvo et al. | |
| 11,300,683 B2 | 4/2022 | Bao et al. | |
| 11,378,691 B2 | 7/2022 | Boloorian et al. | |
| 11,448,729 B2 | 9/2022 | Baba et al. | |
| 11,454,724 B2 | 9/2022 | Michaels et al. | |
| 11,486,975 B1 | 11/2022 | Xiao | |
| 11,493,753 B1 | 11/2022 | Wood et al. | |
| 11,525,916 B2 | 12/2022 | Avci et al. | |
| 11,536,805 B2 | 12/2022 | Asghari et al. | |
| 11,579,300 B1 | 2/2023 | Li | |
| 11,635,491 B2 | 4/2023 | Asghari et al. | |
| 11,710,938 B2 | 7/2023 | Kwon et al. | |
| 11,714,167 B2 | 8/2023 | Feng et al. | |
| 11,768,419 B1 | 9/2023 | Schroder et al. | |
| 11,815,720 B1 | 11/2023 | Tavallaee et al. | |
| 11,860,304 B2 | 1/2024 | Ren et al. | |
| 11,908,075 B2 | 2/2024 | Gorantla | |
| 12,461,224 B2 * | 11/2025 | Sanson | G01S 13/931 |
| 2002/0031304 A1 | 3/2002 | Roberts et al. | |
| 2002/0105632 A1 | 8/2002 | Holton | |
| 2002/0122398 A1 | 9/2002 | Jou | |
| 2002/0159700 A1 | 10/2002 | Coroy et al. | |
| 2003/0030582 A1 | 2/2003 | Vickers | |
| 2003/0031407 A1 | 2/2003 | Weisberg et al. | |
| 2003/0142943 A1 | 7/2003 | Yegnanarayanan et al. | |
| 2003/0183603 A1 | 10/2003 | Forsman et al. | |
| 2003/0212520 A1 | 11/2003 | Campos et al. | |
| 2003/0231686 A1 | 12/2003 | Liu | |
| 2004/0062469 A1 | 4/2004 | Lonov | |
| 2004/0081388 A1 | 4/2004 | Koyama | |
| 2004/0085612 A1 | 5/2004 | Livingston et al. | |
| 2004/0136412 A1 | 7/2004 | Jones | |
| 2004/0228564 A1 | 11/2004 | Gunn, III et al. | |
| 2004/0233964 A1 | 11/2004 | Yamanaka et al. | |
| 2004/0249561 A1 | 12/2004 | Capozzi et al. | |
| 2005/0123227 A1 | 6/2005 | Vonsovici et al. | |
| 2005/0135730 A1 | 6/2005 | Welch et al. | |
| 2005/0213103 A1 | 9/2005 | Everett et al. | |
| 2005/0219068 A1 | 10/2005 | Jones et al. | |
| 2005/0237617 A1 | 10/2005 | Carr et al. | |
| 2005/0244103 A1 | 11/2005 | Kwakernaak | |
| 2006/0078257 A1 | 4/2006 | Park et al. | |
| 2006/0114447 A1 | 6/2006 | Harris et al. | |
| 2006/0232763 A1 | 10/2006 | Jokinen | |
| 2007/0024849 A1 | 2/2007 | Carrig et al. | |
| 2007/0024956 A1 | 2/2007 | Coyle | |
| 2007/0036486 A1 | 2/2007 | Miyadera et al. | |
| 2007/0103362 A1 | 5/2007 | Arikan et al. | |
| 2007/0171407 A1 | 7/2007 | Cole et al. | |
| 2007/0189341 A1 | 8/2007 | Belsley | |
| 2007/0223856 A1 | 9/2007 | Nunoya et al. | |
| 2008/0088184 A1 | 4/2008 | Tung et al. | |
| 2008/0123170 A1 | 5/2008 | Reichert et al. | |
| 2008/0174461 A1 | 7/2008 | Hsu | |
| 2008/0176681 A1 | 7/2008 | Donahoe | |
| 2008/0181550 A1 | 7/2008 | Earnshaw | |
| 2008/0205461 A1 | 8/2008 | Henrichs | |

(56) References Cited

U.S. PATENT DOCUMENTS

| | | | |
|---|---|---|---|
| 2009/0046746 | A1 | 2/2009 | Munroe et al. |
| 2009/0128797 | A1 | 5/2009 | Walsh |
| 2009/0195769 | A1 | 8/2009 | Luo et al. |
| 2009/0279070 | A1 | 11/2009 | Ueno |
| 2009/0309782 | A1 | 12/2009 | Takabayashi et al. |
| 2010/0027379 | A1 | 2/2010 | Saulnier et al. |
| 2010/0046802 | A1 | 2/2010 | Watanabe et al. |
| 2010/0085992 | A1 | 4/2010 | Rakuljic et al. |
| 2010/0159858 | A1 | 6/2010 | Dent et al. |
| 2010/0187442 | A1 | 7/2010 | Hochberg et al. |
| 2010/0271614 | A1 | 10/2010 | Albuquerque et al. |
| 2010/0277714 | A1 | 11/2010 | Pedersen et al. |
| 2010/0280765 | A1 | 11/2010 | Marquardt et al. |
| 2010/0296077 | A1 | 11/2010 | Scott et al. |
| 2010/0309391 | A1 | 12/2010 | Plut |
| 2011/0026643 | A1 | 2/2011 | Ruelke et al. |
| 2011/0068425 | A1 | 3/2011 | Liao et al. |
| 2011/0068426 | A1 | 3/2011 | Zheng et al. |
| 2011/0091155 | A1 | 4/2011 | Yilmaz et al. |
| 2011/0095167 | A1 | 4/2011 | Feng et al. |
| 2011/0141471 | A1 | 6/2011 | Schlotterbeck et al. |
| 2011/0164845 | A1 | 7/2011 | Jenkins et al. |
| 2011/0241895 | A1 | 10/2011 | Griffin |
| 2012/0038506 | A1 | 2/2012 | Kanamoto et al. |
| 2012/0062230 | A1 | 3/2012 | Vaughan, Jr. et al. |
| 2012/0081786 | A1 | 4/2012 | Mizuyama et al. |
| 2012/0098935 | A1 | 4/2012 | Schmidt et al. |
| 2012/0106579 | A1 | 5/2012 | Roos et al. |
| 2012/0120382 | A1 | 5/2012 | Silny et al. |
| 2012/0182544 | A1 | 7/2012 | Asahara et al. |
| 2012/0206712 | A1 | 8/2012 | Chang et al. |
| 2013/0044309 | A1 | 2/2013 | Dakin et al. |
| 2013/0044311 | A1 | 2/2013 | Rakuljic |
| 2013/0051655 | A1 | 2/2013 | Collard et al. |
| 2013/0056623 | A1 | 3/2013 | Lipson et al. |
| 2013/0083389 | A1 | 4/2013 | Dakin et al. |
| 2013/0094074 | A1 | 4/2013 | Asghari et al. |
| 2013/0162976 | A1 | 6/2013 | Dakin et al. |
| 2013/0206967 | A1 | 8/2013 | Shpunt et al. |
| 2013/0242400 | A1 | 9/2013 | Chen |
| 2013/0321791 | A1 | 12/2013 | Feldkhun et al. |
| 2014/0035776 | A1 | 2/2014 | Sochen et al. |
| 2014/0036252 | A1 | 2/2014 | Amzajerdian et al. |
| 2014/0054451 | A1 | 2/2014 | Abedin et al. |
| 2014/0112357 | A1 | 4/2014 | Abedin et al. |
| 2014/0133864 | A1 | 5/2014 | Asghari et al. |
| 2014/0153931 | A1 | 6/2014 | Doerr |
| 2014/0169392 | A1 | 6/2014 | Kim |
| 2014/0211298 | A1 | 7/2014 | Sayyah et al. |
| 2014/0269790 | A1 | 9/2014 | Sebastian et al. |
| 2014/0332918 | A1 | 11/2014 | Li et al. |
| 2014/0376000 | A1 | 12/2014 | Swanson et al. |
| 2014/0376001 | A1 | 12/2014 | Swanson |
| 2015/0055115 | A1 | 2/2015 | Pedersen et al. |
| 2015/0056740 | A1 | 2/2015 | Menezo |
| 2015/0109603 | A1 | 4/2015 | Kim et al. |
| 2015/0171593 | A1 | 6/2015 | Duan et al. |
| 2015/0177367 | A1 | 6/2015 | Sebastian et al. |
| 2015/0177383 | A1 | 6/2015 | Ruff et al. |
| 2015/0185244 | A1 | 7/2015 | Inoue et al. |
| 2015/0207296 | A1 | 7/2015 | Rickman et al. |
| 2015/0260843 | A1 | 9/2015 | Lewis |
| 2015/0333480 | A1 | 11/2015 | Santis et al. |
| 2015/0346340 | A1 | 12/2015 | Yaacobi et al. |
| 2015/0378012 | A1 | 12/2015 | Sayyah et al. |
| 2015/0378187 | A1 | 12/2015 | Heck et al. |
| 2016/0084945 | A1 | 3/2016 | Rodrigo et al. |
| 2016/0161600 | A1 | 6/2016 | Eldada et al. |
| 2016/0170141 | A1 | 6/2016 | Luo et al. |
| 2016/0209594 | A1 | 7/2016 | Bahl |
| 2016/0223663 | A1 | 8/2016 | Schmalenberg et al. |
| 2016/0261091 | A1 | 9/2016 | Santis et al. |
| 2016/0274226 | A1 | 9/2016 | Lewis |
| 2016/0290891 | A1 | 10/2016 | Feng et al. |
| 2016/0291135 | A1 | 10/2016 | Ando et al. |
| 2016/0299228 | A1 | 10/2016 | Maleki et al. |
| 2016/0306043 | A1 | 10/2016 | Moss et al. |
| 2016/0324438 | A1 | 11/2016 | Halpern et al. |
| 2016/0341818 | A1 | 11/2016 | Gilliland et al. |
| 2016/0373191 | A1 | 12/2016 | Fathololoumi et al. |
| 2016/0377721 | A1 | 12/2016 | Lardin et al. |
| 2016/0377722 | A1 | 12/2016 | Lardin et al. |
| 2017/0003451 | A1 | 1/2017 | Ma et al. |
| 2017/0040775 | A1 | 2/2017 | Takabayashi et al. |
| 2017/0059779 | A1 | 3/2017 | Okayama |
| 2017/0067985 | A1 | 3/2017 | Schwarz et al. |
| 2017/0098917 | A1 | 4/2017 | Popovic et al. |
| 2017/0108649 | A1 | 4/2017 | Dallessasse et al. |
| 2017/0139411 | A1 | 5/2017 | Hartung et al. |
| 2017/0146639 | A1 | 5/2017 | Carothers |
| 2017/0146641 | A1 | 5/2017 | Walsh et al. |
| 2017/0153319 | A1 | 6/2017 | Villeneuve et al. |
| 2017/0155225 | A1 | 6/2017 | Villeneuve et al. |
| 2017/0184450 | A1 | 6/2017 | Doylend et al. |
| 2017/0207600 | A1 | 7/2017 | Klamkin et al. |
| 2017/0268866 | A1 | 9/2017 | Berz |
| 2017/0269198 | A1 | 9/2017 | Hall et al. |
| 2017/0269215 | A1 | 9/2017 | Hall et al. |
| 2017/0299697 | A1 | 10/2017 | Swanson |
| 2017/0299721 | A1 | 10/2017 | Eichenholz et al. |
| 2017/0307648 | A1 | 10/2017 | Kotake et al. |
| 2017/0307736 | A1 | 10/2017 | Donovan |
| 2017/0328988 | A1 | 11/2017 | Magee et al. |
| 2017/0343652 | A1 | 11/2017 | de Mersseman et al. |
| 2017/0343791 | A1 | 11/2017 | Swanson |
| 2017/0350965 | A1 | 12/2017 | Schmalenberg |
| 2017/0350983 | A1 | 12/2017 | Hall et al. |
| 2017/0356983 | A1 | 12/2017 | Jeong et al. |
| 2017/0371227 | A1 | 12/2017 | Skirlo et al. |
| 2017/0372602 | A1 | 12/2017 | Gilliland et al. |
| 2018/0002432 | A1 | 1/2018 | Gilliland et al. |
| 2018/0003805 | A1 | 1/2018 | Popovich et al. |
| 2018/0024246 | A1 | 1/2018 | Jeong et al. |
| 2018/0031680 | A1 | 2/2018 | Lee et al. |
| 2018/0039154 | A1 | 2/2018 | Hashemi et al. |
| 2018/0050704 | A1 | 2/2018 | Tascione et al. |
| 2018/0073932 | A1 | 3/2018 | Minet et al. |
| 2018/0088211 | A1 | 3/2018 | Gill et al. |
| 2018/0095284 | A1 | 4/2018 | Welch et al. |
| 2018/0102442 | A1 | 4/2018 | Wang et al. |
| 2018/0103431 | A1 | 4/2018 | Suh et al. |
| 2018/0113216 | A1 | 4/2018 | Kremer et al. |
| 2018/0120433 | A1 | 5/2018 | Eichenholz et al. |
| 2018/0120436 | A1 | 5/2018 | Smits |
| 2018/0136321 | A1 | 5/2018 | Verghese et al. |
| 2018/0143322 | A1 | 5/2018 | Rosenzweig et al. |
| 2018/0143374 | A1 | 5/2018 | Coolbaugh et al. |
| 2018/0149752 | A1 | 5/2018 | Tadano |
| 2018/0164408 | A1 | 6/2018 | Hall et al. |
| 2018/0172918 | A1 | 6/2018 | Lane et al. |
| 2018/0188371 | A1 | 7/2018 | Bao et al. |
| 2018/0217471 | A1 | 8/2018 | Lee et al. |
| 2018/0224547 | A1 | 8/2018 | Crouch et al. |
| 2018/0231643 | A1 | 8/2018 | Lee et al. |
| 2018/0269890 | A1 | 9/2018 | Ojeda |
| 2018/0287343 | A1 | 10/2018 | Morrison et al. |
| 2018/0306925 | A1 | 10/2018 | Hosseini et al. |
| 2018/0329037 | A1 | 11/2018 | Bozchalooi et al. |
| 2018/0331493 | A1 | 11/2018 | Lin et al. |
| 2018/0348343 | A1 | 12/2018 | Achour et al. |
| 2018/0351317 | A1 | 12/2018 | Vermeulen |
| 2018/0356344 | A1 | 12/2018 | Yi |
| 2018/0356522 | A1 | 12/2018 | Kikuchi et al. |
| 2018/0356528 | A1 | 12/2018 | Schaffner et al. |
| 2018/0359033 | A1 | 12/2018 | Xu et al. |
| 2018/0364334 | A1 | 12/2018 | Xiang et al. |
| 2018/0364336 | A1 | 12/2018 | Hosseini et al. |
| 2018/0372517 | A1 | 12/2018 | Yao et al. |
| 2018/0372530 | A1 | 12/2018 | Welle et al. |
| 2018/0372870 | A1 | 12/2018 | Puglia |
| 2018/0375284 | A1 | 12/2018 | Permogorov |
| 2019/0004151 | A1 | 1/2019 | Abediasl et al. |
| 2019/0011558 | A1 | 1/2019 | Crouch et al. |
| 2019/0011559 | A1 | 1/2019 | Desai et al. |

(56) References Cited

U.S. PATENT DOCUMENTS

2019/0018110 A1 1/2019 Kremer et al.
2019/0018121 A1 1/2019 Sayyah et al.
2019/0018139 A1 1/2019 Sayyah et al.
2019/0018140 A1 1/2019 Sarkissian et al.
2019/0018144 A1 1/2019 Imaki et al.
2019/0018197 A1 1/2019 Boutami et al.
2019/0025094 A1 1/2019 Lewis et al.
2019/0025426 A1 1/2019 Satyan et al.
2019/0025431 A1 1/2019 Satyan et al.
2019/0027897 A1 1/2019 Wei et al.
2019/0033453 A1 1/2019 Crouch et al.
2019/0049569 A1 2/2019 Kim et al.
2019/0064329 A1 2/2019 Liu et al.
2019/0064332 A1 2/2019 Schmalenberg et al.
2019/0064358 A1 2/2019 Desai et al.
2019/0072651 A1 3/2019 Halmos et al.
2019/0072672 A1 3/2019 Yao
2019/0086514 A1 3/2019 Dussan et al.
2019/0086518 A1 3/2019 Halstig et al.
2019/0086550 A1 3/2019 Dussan et al.
2019/0096259 A1 3/2019 McQuillen et al.
2019/0101647 A1 4/2019 Feshali et al.
2019/0107623 A1 4/2019 Campbell et al.
2019/0120939 A1 4/2019 O'Keeffe
2019/0146074 A1 5/2019 Hjelmstad
2019/0146087 A1 5/2019 Mansur et al.
2019/0146164 A1 5/2019 Krichevsky
2019/0154816 A1 5/2019 Hughes et al.
2019/0154832 A1 5/2019 Maleki et al.
2019/0154835 A1 5/2019 Maleki et al.
2019/0179012 A1 6/2019 Heo
2019/0187269 A1 6/2019 Tong et al.
2019/0201023 A1 7/2019 Shelton, IV et al.
2019/0204419 A1 7/2019 Baba et al.
2019/0204441 A1 7/2019 Feneyrou et al.
2019/0204443 A1 7/2019 Yao et al.
2019/0250253 A1 8/2019 Hung et al.
2019/0250396 A1 8/2019 Blanche et al.
2019/0257924 A1 8/2019 Li et al.
2019/0257927 A1 8/2019 Yao
2019/0265351 A1 8/2019 Madison et al.
2019/0266741 A1 8/2019 Uehara
2019/0271767 A1 9/2019 Keilaf et al.
2019/0280453 A1 9/2019 Gopinath et al.
2019/0293794 A1 9/2019 Zhang et al.
2019/0302262 A1 10/2019 Singer
2019/0302268 A1 10/2019 Singer et al.
2019/0310372 A1 10/2019 Crouch et al.
2019/0310377 A1 10/2019 Lodin et al.
2019/0317195 A1 10/2019 Sun et al.
2019/0331797 A1 10/2019 Singer et al.
2019/0339388 A1 11/2019 Crouch et al.
2019/0339389 A1 11/2019 Russo et al.
2019/0341739 A1 11/2019 Loh et al.
2019/0346056 A1 11/2019 Staiger et al.
2019/0346568 A1 11/2019 Feng et al.
2019/0353787 A1 11/2019 Petit
2019/0353789 A1 11/2019 Boloorian et al.
2019/0353977 A1 11/2019 Hung
2019/0361122 A1 11/2019 Crouch et al.
2019/0369244 A1 12/2019 Asghari et al.
2019/0369251 A1 12/2019 Feng et al.
2019/0372307 A1 12/2019 Morton
2019/0377135 A1 12/2019 Rad et al.
2019/0383907 A1 12/2019 Belsley et al.
2019/0391242 A1 12/2019 Asghari et al.
2019/0391243 A1 12/2019 Nicolaescu
2020/0018857 A1 1/2020 Feng et al.
2020/0021082 A1 1/2020 Rakuljic
2020/0025898 A1 1/2020 Ain-Kedem et al.
2020/0025926 A1 1/2020 Asghari et al.
2020/0043176 A1 2/2020 Maila et al.
2020/0049799 A1* 2/2020 Ando ...................... G01S 7/484
2020/0057143 A1 2/2020 Asghari et al.
2020/0064116 A1 2/2020 Salvade et al.
2020/0064477 A1 2/2020 Komatsuzaki
2020/0064483 A1 2/2020 Li et al.
2020/0072978 A1 3/2020 Boloorian et al.
2020/0072979 A1 3/2020 Boloorian et al.
2020/0076152 A1 3/2020 Eichenholz et al.
2020/0088876 A1 3/2020 Tanemura et al.
2020/0103501 A1 4/2020 Kotelnikov et al.
2020/0104647 A1 4/2020 Pirim
2020/0110179 A1 4/2020 Talty et al.
2020/0116837 A1 4/2020 Aghari et al.
2020/0116842 A1 4/2020 Asghari et al.
2020/0116849 A1 4/2020 Wennersten et al.
2020/0116863 A1 4/2020 Jensen et al.
2020/0124711 A1 4/2020 Rezk et al.
2020/0132843 A1 4/2020 Hart et al.
2020/0132849 A1 4/2020 Moebius et al.
2020/0142065 A1 5/2020 Boloorian et al.
2020/0142066 A1 5/2020 Sandborn et al.
2020/0142068 A1 5/2020 Crouch et al.
2020/0150241 A1 5/2020 Byrnes et al.
2020/0158830 A1 5/2020 Asghari et al.
2020/0158833 A1 5/2020 Baba et al.
2020/0158839 A1 5/2020 Lin et al.
2020/0166617 A1 5/2020 Crouch et al.
2020/0166647 A1 5/2020 Crouch et al.
2020/0174095 A1 6/2020 Altintas et al.
2020/0182973 A1 6/2020 Luff et al.
2020/0182978 A1 6/2020 Maleki et al.
2020/0200879 A1 6/2020 Halstig et al.
2020/0209366 A1 7/2020 Maleki
2020/0225332 A1 7/2020 Wagner et al.
2020/0226769 A1 7/2020 Das et al.
2020/0241119 A1 7/2020 Asghari et al.
2020/0249324 A1 8/2020 Steinberg et al.
2020/0249350 A1 8/2020 Schmalenberg
2020/0256956 A1 8/2020 Luff et al.
2020/0278432 A1 9/2020 Thorpe et al.
2020/0284879 A1 9/2020 Asghari et al.
2020/0284883 A1 9/2020 Ferreira et al.
2020/0284913 A1 9/2020 Amelot et al.
2020/0292706 A1 9/2020 Hexsel et al.
2020/0295537 A1 9/2020 Zilkie
2020/0300980 A1 9/2020 Behzadi et al.
2020/0300993 A1 9/2020 Behzadi et al.
2020/0301070 A1 9/2020 Nagarajan
2020/0309949 A1 10/2020 Feng et al.
2020/0309952 A1 10/2020 Imaki et al.
2020/0319314 A1 10/2020 Behzadi et al.
2020/0319409 A1 10/2020 Su et al.
2020/0326476 A1 10/2020 Hiratani
2020/0333441 A1 10/2020 Diaz
2020/0333443 A1 10/2020 Boloorian et al.
2020/0333533 A1 10/2020 Rogers et al.
2020/0363515 A1 11/2020 Luff et al.
2020/0373662 A1 11/2020 Gleason et al.
2020/0379112 A1 12/2020 Ujhara et al.
2020/0379115 A1 12/2020 Yang et al.
2020/0400821 A1 12/2020 Baker et al.
2020/0400822 A1 12/2020 Ando et al.
2020/0408911 A1 12/2020 Boloorian et al.
2020/0408912 A1 12/2020 Boloorian et al.
2021/0010802 A1 1/2021 Onohara et al.
2021/0033732 A1 2/2021 Boloorian et al.
2021/0055388 A1 2/2021 Feng et al.
2021/0063541 A1 3/2021 Zheng et al.
2021/0063542 A1 3/2021 Zheng et al.
2021/0072385 A1 3/2021 Sandborn et al.
2021/0072389 A1 3/2021 Boloorian et al.
2021/0072445 A1 3/2021 Kurokawa et al.
2021/0088657 A1 3/2021 Shah et al.
2021/0096228 A1 4/2021 Behzadi et al.
2021/0109195 A1 4/2021 Feng et al.
2021/0116778 A1 4/2021 Zhang et al.
2021/0132232 A1 5/2021 Asghari et al.
2021/0141058 A1 5/2021 Piggott et al.
2021/0149056 A1 5/2021 Luff et al.
2021/0156997 A1 5/2021 Weinert et al.
2021/0156999 A1 5/2021 Nishino et al.
2021/0159659 A1 5/2021 Bandyopadhyay et al.

(56) References Cited

U.S. PATENT DOCUMENTS

| | | | | |
|---|---|---|---|---|
| 2021/0159664 | A1 | 5/2021 | Liu et al. | |
| 2021/0165102 | A1 | 6/2021 | Crouch et al. | |
| 2021/0173058 | A1 | 6/2021 | Viswanatha et al. | |
| 2021/0181320 | A1 | 6/2021 | Oza et al. | |
| 2021/0190907 | A1 | 6/2021 | Sahara | |
| 2021/0190921 | A1 | 6/2021 | Golikov et al. | |
| 2021/0190925 | A1 | 6/2021 | Asghari et al. | |
| 2021/0199797 | A1 | 7/2021 | Choi et al. | |
| 2021/0231805 | A1 | 7/2021 | Dehlinger et al. | |
| 2021/0239811 | A1 | 8/2021 | Asghari et al. | |
| 2021/0255324 | A1 | 8/2021 | Dunn et al. | |
| 2021/0278540 | A1 | 9/2021 | Maayan et al. | |
| 2021/0293923 | A1 | 9/2021 | Arkind et al. | |
| 2021/0293934 | A1 | 9/2021 | Sun et al. | |
| 2021/0316756 | A1 | 10/2021 | Davydenko | |
| 2021/0318436 | A1 | 10/2021 | Boloorian et al. | |
| 2021/0318442 | A1 | 10/2021 | Hosseini et al. | |
| 2021/0325520 | A1 | 10/2021 | Cai et al. | |
| 2021/0333386 | A1 | 10/2021 | Park et al. | |
| 2021/0349196 | A1 | 11/2021 | Wang et al. | |
| 2021/0349216 | A1 | 11/2021 | Behroozpour et al. | |
| 2021/0356592 | A1 | 11/2021 | Behroozpour | |
| 2021/0364607 | A1 | 11/2021 | Davydenko | |
| 2021/0373137 | A1 | 12/2021 | Tan et al. | |
| 2021/0373162 | A1 | 12/2021 | Wu et al. | |
| 2021/0389244 | A1 | 12/2021 | Bowman et al. | |
| 2021/0396879 | A1 | 12/2021 | Sun et al. | |
| 2021/0405194 | A1 | 12/2021 | Tsuchida | |
| 2022/0003842 | A1 | 1/2022 | Wang et al. | |
| 2022/0006260 | A1 | 1/2022 | Lipson et al. | |
| 2022/0043149 | A1 * | 2/2022 | LaChapelle | G01S 7/484 |
| 2022/0043151 | A1 | 2/2022 | Baker et al. | |
| 2022/0050187 | A1 | 2/2022 | Yao | |
| 2022/0065999 | A1 | 3/2022 | Phare et al. | |
| 2022/0066017 | A1 | 3/2022 | Gipson | |
| 2022/0075121 | A1 | 3/2022 | Lowder et al. | |
| 2022/0082696 | A1 | 3/2022 | Kjellman et al. | |
| 2022/0085567 | A1 | 3/2022 | Lowder et al. | |
| 2022/0099837 | A1 | 3/2022 | Crouch et al. | |
| 2022/0107411 | A1 | 4/2022 | Koonath et al. | |
| 2022/0113390 | A1 | 4/2022 | Koonath et al. | |
| 2022/0113422 | A1 | 4/2022 | Hillard et al. | |
| 2022/0121080 | A1 | 4/2022 | Yao | |
| 2022/0179055 | A1 | 6/2022 | Ferrara et al. | |
| 2022/0187457 | A1 | 6/2022 | Daami et al. | |
| 2022/0187458 | A1 | 6/2022 | Piggott et al. | |
| 2022/0187463 | A1 | 6/2022 | Maheshwari et al. | |
| 2022/0196814 | A1 | 6/2022 | Lin et al. | |
| 2022/0206164 | A1 | 6/2022 | Takada | |
| 2022/0244360 | A1 | 8/2022 | Phare et al. | |
| 2022/0283389 | A1 | 9/2022 | Yang et al. | |
| 2022/0291361 | A1 | 9/2022 | Asghari et al. | |
| 2022/0308192 | A1 | 9/2022 | John et al. | |
| 2022/0334225 | A1 | 10/2022 | Davydenko et al. | |
| 2022/0342048 | A1 | 10/2022 | Asghari et al. | |
| 2022/0342078 | A1 | 10/2022 | Rakuljic et al. | |
| 2022/0365214 | A1 | 11/2022 | Sandborn et al. | |
| 2022/0373667 | A1 | 11/2022 | Khatana et al. | |
| 2022/0373739 | A1 | 11/2022 | Abril et al. | |
| 2022/0404470 | A1 | 12/2022 | Asghari et al. | |
| 2022/0413100 | A1 | 12/2022 | Jain | |
| 2022/0413143 | A1 | 12/2022 | Parsa et al. | |
| 2023/0027271 | A1 | 1/2023 | Jin et al. | |
| 2023/0069201 | A1 | 3/2023 | Asghari et al. | |
| 2023/0104453 | A1 | 4/2023 | Asghari et al. | |
| 2023/0194952 | A1 | 6/2023 | Muranaka et al. | |
| 2023/0228878 | A1 | 7/2023 | Asghari et al. | |
| 2023/0258861 | A1 | 8/2023 | Vercruysse et al. | |
| 2023/0266466 | A1 | 8/2023 | Ummethala et al. | |
| 2023/0288566 | A1 | 9/2023 | Nadkarni et al. | |
| 2023/0296732 | A1 | 9/2023 | Xiao | |
| 2024/0012112 | A1 | 1/2024 | Warke et al. | |
| 2024/0012147 | A1 | 1/2024 | Tavallaee et al. | |
| 2024/0255618 | A1 | 8/2024 | Asghari et al. | |
| 2025/0085401 | A1 | 3/2025 | Zhou et al. | |
| 2025/0094380 | A1 | 3/2025 | Mazed | |
| 2025/0130316 | A1 | 4/2025 | Asghari et al. | |

FOREIGN PATENT DOCUMENTS

| | | | | |
|---|---|---|---|---|
| CN | 101258420 | A | 9/2008 | |
| CN | 101356450 | A | 1/2009 | |
| CN | 102565788 | A | 7/2012 | |
| CN | 103874945 | A | 6/2014 | |
| CN | 104135305 | A | 11/2014 | |
| CN | 104459881 | A | 3/2015 | |
| CN | 104466640 | A | 3/2015 | |
| CN | 204479750 | U | 7/2015 | |
| CN | 105589074 | A | 5/2016 | |
| CN | 105680320 | A | 6/2016 | |
| CN | 105917257 | A | 8/2016 | |
| CN | 106062583 | A | 10/2016 | |
| CN | 106154248 | A | 11/2016 | |
| CN | 106410607 | A | 2/2017 | |
| CN | 106773028 | A | 5/2017 | |
| CN | 106842232 | A | 6/2017 | |
| CN | 106959439 | A | 7/2017 | |
| CN | 107144847 | A | 9/2017 | |
| CN | 107305184 | A | 10/2017 | |
| CN | 107367734 | A | 11/2017 | |
| CN | 107923976 | A | 4/2018 | |
| CN | 107976666 | A | 5/2018 | |
| CN | 108139465 | A | 6/2018 | |
| CN | 108291970 | A | 7/2018 | |
| CN | 108603758 | A | 9/2018 | |
| CN | 108761398 | A | 11/2018 | |
| CN | 109254296 | A | 1/2019 | |
| CN | 109471129 | A | 3/2019 | |
| CN | 109642952 | A | 4/2019 | |
| CN | 110036276 | A | 7/2019 | |
| CN | 107192355 | B | 8/2019 | |
| CN | 110161516 | A | 8/2019 | |
| CN | 110187350 | A | 8/2019 | |
| CN | 110412685 | A | 11/2019 | |
| CN | 110806579 | A | 2/2020 | |
| CN | 111007533 | A | 4/2020 | |
| CN | 111338025 | A | 6/2020 | |
| CN | 112241014 | A | 1/2021 | |
| CN | 114419152 | A | 4/2022 | |
| CN | 110764074 | B | 6/2022 | |
| CN | 115166761 | A * | 10/2022 | G01S 17/34 |
| DE | 10 2015 222061 | A1 | 5/2017 | |
| DE | 10 2017 200795 | A1 | 7/2018 | |
| DE | 102018101935 | A1 | 8/2018 | |
| DE | 10 2017 106 226 | A1 | 9/2018 | |
| DE | 102019124598 | A1 | 3/2020 | |
| EP | 0 523 921 | A1 | 1/1993 | |
| EP | 2796890 | A1 | 10/2014 | |
| EP | 2955542 | B1 | 4/2017 | |
| EP | 3276371 | A1 | 1/2018 | |
| EP | 3339924 | A1 | 6/2018 | |
| EP | 3259615 | B1 | 11/2019 | |
| EP | 3719537 | A1 | 10/2020 | |
| EP | 3 584 893 | B1 | 6/2021 | |
| EP | 3889644 | A1 | 10/2021 | |
| GB | 1 585 053 | A | 2/1981 | |
| GB | 2173664 | A | 10/1986 | |
| GB | 2586499 | A | 2/2021 | |
| JP | S53-123004 | A | 10/1978 | |
| JP | H05-158096 | A | 6/1993 | |
| JP | H07-5261 | A | 1/1995 | |
| JP | H07-89147 | B2 | 9/1995 | |
| JP | H09-33872 | A | 2/1997 | |
| JP | H1010227 | A | 1/1998 | |
| JP | 2003224321 | A | 8/2003 | |
| JP | 2004-151022 | A | 5/2004 | |
| JP | 2007064803 | A | 3/2007 | |
| JP | 2007184511 | A | 7/2007 | |
| JP | 2008160130 | A | 7/2008 | |
| JP | 2008292370 | A | 12/2008 | |
| JP | 2009-115696 | A | 5/2009 | |
| JP | 2010151806 | A | 7/2010 | |
| JP | 2010271624 | A | 12/2010 | |

(56) References Cited

FOREIGN PATENT DOCUMENTS

| | | | |
|---|---|---|---|
| JP | 2012146787 | A | 8/2012 |
| JP | 2013165407 | A | 8/2013 |
| JP | 2014202716 | A | 10/2014 |
| JP | 2015-018640 | A | 1/2015 |
| JP | 2015092184 | A | 5/2015 |
| JP | 2015-517094 | A | 6/2015 |
| JP | 2015172540 | A | 10/2015 |
| JP | 2015180735 | A | 10/2015 |
| JP | 2015230259 | A | 12/2015 |
| JP | 2016111087 | A | 6/2016 |
| JP | 2016-525209 | A | 8/2016 |
| JP | 5975203 | B2 | 8/2016 |
| JP | 2017502315 | A | 1/2017 |
| JP | 2017097340 | A | 6/2017 |
| JP | 2017106897 | A | 6/2017 |
| JP | 2017524918 | A | 8/2017 |
| JP | 2017161484 | A | 9/2017 |
| JP | 2017-198514 | A | 11/2017 |
| JP | 2017-211348 | A | 11/2017 |
| JP | 2018511054 | A | 4/2018 |
| JP | 2018-512600 | A | 5/2018 |
| JP | 2018520346 | A | 7/2018 |
| JP | 2018529955 | A | 10/2018 |
| JP | 2018188284 | A | 11/2018 |
| JP | 2018200273 | A | 12/2018 |
| JP | 2019502925 | A | 1/2019 |
| JP | 2019095218 | A | 6/2019 |
| JP | 2019525195 | A | 9/2019 |
| JP | 2019-203977 | A | 11/2019 |
| JP | 2019-537012 | A | 12/2019 |
| JP | 2020-012641 | A | 1/2020 |
| JP | 2020-16639 | A | 1/2020 |
| JP | 2020-34546 | A | 3/2020 |
| JP | 2002090457 | A | 3/2020 |
| JP | 2020085723 | A | 6/2020 |
| JP | 2021004800 | A | 1/2021 |
| JP | 2021032848 | A | 3/2021 |
| JP | 7397009 | B2 | 12/2023 |
| KR | 20060086182 | A | 7/2006 |
| KR | 10-2015-0045735 | A | 4/2015 |
| KR | 20180013598 | A | 2/2018 |
| KR | 101 931 022 | B1 | 12/2018 |
| WO | 97/11396 | A1 | 3/1997 |
| WO | 2010123182 | A1 | 10/2010 |
| WO | 2010127151 | A1 | 11/2010 |
| WO | 2012123668 | A1 | 9/2012 |
| WO | 2012153309 | A2 | 11/2012 |
| WO | 2013/049579 | A1 | 4/2013 |
| WO | 2014/203654 | A1 | 12/2014 |
| WO | 2014/206630 | A1 | 12/2014 |
| WO | 2015/044370 | A1 | 4/2015 |
| WO | 2015/058209 | A1 | 4/2015 |
| WO | 2015/098027 | A1 | 7/2015 |
| WO | 2015/200800 | A1 | 12/2015 |
| WO | 2016/024332 | A1 | 2/2016 |
| WO | 2016/097409 | A2 | 6/2016 |
| WO | 2017/023107 | A1 | 2/2017 |
| WO | 2017/083597 | A1 | 5/2017 |
| WO | 2017/095817 | A1 | 6/2017 |
| WO | 2017/102156 | A1 | 6/2017 |
| WO | 2017/187510 | A1 | 11/2017 |
| WO | 2017/216581 | A1 | 12/2017 |
| WO | 2018/003852 | A1 | 1/2018 |
| WO | 2018/036946 | A1 | 3/2018 |
| WO | 2018/060318 | A1 | 4/2018 |
| WO | 2018/116412 | A1 | 6/2018 |
| WO | 2018/160240 | A2 | 9/2018 |
| WO | 2018/170478 | A1 | 9/2018 |
| WO | 2018/230474 | A1 | 12/2018 |
| WO | 2019/010320 | A1 | 1/2019 |
| WO | 2019/018894 | A1 | 1/2019 |
| WO | 2019/121069 | A1 | 6/2019 |
| WO | 2019/130472 | A1 | 7/2019 |
| WO | 2019/149815 | A1 | 8/2019 |
| WO | 2019/196135 | A1 | 10/2019 |
| WO | 2019/217761 | A1 | 11/2019 |
| WO | 2019/217857 | A1 | 11/2019 |
| WO | 2019/236430 | A1 | 12/2019 |
| WO | 2019/236464 | A1 | 12/2019 |
| WO | 2020/005537 | A1 | 1/2020 |
| WO | 2020/033161 | A1 | 2/2020 |
| WO | 2020/046513 | A1 | 3/2020 |
| WO | 2020/076566 | A1 | 4/2020 |
| WO | 2020/110779 | A1 | 6/2020 |
| WO | 2020/129284 | A1 | 6/2020 |
| WO | 2020/167515 | A1 | 8/2020 |
| WO | 2020/190491 | A1 | 9/2020 |
| WO | 2020/205450 | A1 | 10/2020 |
| WO | 2020/234797 | A1 | 11/2020 |
| WO | 2020/251633 | A1 | 12/2020 |
| WO | 2021/024038 | A1 | 2/2021 |
| WO | 2021/252894 | A1 | 12/2021 |
| WO | 2022/013422 | A1 | 1/2022 |
| WO | 2022/233503 | A1 | 11/2022 |
| WO | 2023/006470 | A1 | 2/2023 |
| WO | 2023/118295 | A1 | 6/2023 |

OTHER PUBLICATIONS

Satyan, N et al, "Precise control of broadband frequency chirps using optoelectronic feedback," Optics Express, Aug. 31, 2009, vol. 17, No. 18, pp. 15991-15999.

Schulmeister, Karl, "White Paper The new edition of the international laser product safety standard", IEC 60825-1, 2014.

Self, "Focusing of spherical Gaussian beams", Applied Optics, Mar. 1, 1983, vol. 22, No. 5, pp. 658-661.

Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.

Smit, Meint K. C. v., "Phasar-Based WDM-Devices: Principles, Design and Applications", IEEE Journal of Selected Topics in Quantum Electronics, Jan. 1, 1996, 2(2), 236-250.

Soref, Richard A. et al. "Electrooptical Effects in Silicon", IEEE Journal of Quantum Electronics, vol. QE-23, No. 1, Jan. 1987, pp. 123-129.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, July/Aug. 2014. IEEE Journal of Selected Topics in Quantum Electronics.

"The Demultiplexer" accessed from www.electronics-tutorials.ws/combination/comb_3.html with WayBack Machine dated Feb. 9, 2008, 2 pages.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechTHESIS, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Wojtkiewicz et al., "Two-dimensional signal processing in FMCW radars", National Conference on Circuit Theory and Electronic Networks, vol. 2, Oct. 1997, pp. 1-6.

(56) References Cited

OTHER PUBLICATIONS

Xu et al., "Methods and applications of on-chip beam splitting: A review", Frontiers in Physics, Sep. 6, 2022, 16 pages.
Yao et al., "Non-mechanical Lidar beamforming enabled by combined wavelength-division- and time-division-multiplexing", Available at SSRN.com, Oct. 5, 2022, 13 pages, https://ssrn.com/abstract=4238741 or http://dx.doi.org/10.2139/ssrn.4238741.
Zhu et al., "Dual-Comb Ranging", Engineering, 4, Oct. 16, 2018, pp. 772-778.
Aalto, Timo Eta L., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.
Amzajerdian et al., "Demonstration of Coherent Doppler Lidar for Navigation in GPS-Denied Environments", Laser Radar Technology and Applications XXII, SPIE Defense and Security, Apr. 9-13, 2017, vol. 10191, 1019102.
Anderson et al., "ladar: Frequency-Modulated Continuous Wave Laser Detection and Ranging", Photogrammetric Engineering & Remote Sensing, vol. 83, No. 11, Nov. 2017.
Baghmisheh, B. B., "Chip-scale Lidar", Jan. 19, 2017, Electrical Engineering and Computer Sciences University of California, Berkeley.
Banzhaf et al., "Phase-Coded FMCW Lidar", 2021 29th European Signal Processing Conference (EUSIPCO), Eurasip, Aug. 23, 2021, XX034038479, pp. 1775-1779, retrieved on Nov. 15, 2021.
Behroozpour et al., "Electronic-Photonic Integrated Circulator 3D Microimaging", IEEE Journal of Solid-State Circuits, Jan. 2017, vol. 52, No. 1, pp. 161-172.
Behroozpour, B. et al., "Lidar System Architectures and Circuits," IEEE Communications Magazine, Oct. 2017, pp. 135-142.
Carter et al., "Lidar 101: An Introduction to Lidar Technology, Data, and Applications", Nov. 2012, NOAA Coastal Services Center, 76 pages.
Chan, M.K, "Atmospheric transmission windows for high energy short pulse lasers", Thesis, Naval Postgraduate School, Dec. 2003.
Chang et al., "A review of UAV autonomous navigation in GPS-denied environments", Robots and Autonomous Systems, Dec. 2023, 170, 104533, 23 pages.
Conditional Euclidean Clustering, retrieved on Jul. 9, 2022 from https://pcl.readthedocs.io/projects/tutorials/en/latest/cluster_extraction. html#cluster-extraction.
Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.
Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.
Doherty, Fiona, International Preliminary Report on Patentability and Written Opinion, The International Bureau of WIPO, PCT/US2024/018273, Sep. 18, 2025.
Doylend, J. K., "Two-dimensional free-space beam steering with an optical phased array on silicon-on-insulator", Oct. 1, 2011, Optics Express, 19(22), 21595-2160.
Ellis, Jonathan D., "Field Guide to Displacement Measuring Interferometry", SPIE Field Guides, vol. FG30, Jan. 7, 2014, 155 pages.
Euclidean Cluster Extraction, retrieved on Jul. 9, 2022 from https://pcl.readthedocs.io/projects/tutorials/en/latest/conditional_euclidean_clustering.html.
Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.
Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.
Goodman, J., "Speckle Phenomena in Optics Theory and Applications", Roberts and Company, Sep. 28, 2007, 130(2), pp. 413-414.
Gulati, et al., "A Low-Power Reconfigurable Analog-to-Digital Converter", IEEE Journal of Solid-State Circuits, Dec. 2001, vol. 36, No. 12, pp. 1900-1911.
Guo et al., "Beat-frequency adjustable Er3+-doped DBR fiber laser for ultrasound detection", Optics Express, Jan. 31, 2011, vol. 19, No. 3, pp. 2485-2492.
Haran, T., "Short-wave infrared diffuse reflectance of Textile Materials", Thesis, Georgia State University, 2008.
Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.
Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.
Ince et al., "An S-band frequency-modulated continuous-wave boundary layer profiler: Description and initial results", Radio Science, Aug. 5, 2003, vol. 38, Issue 4, 1072, 10 pages.
Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.
Kaasalainen, S., "The multispectral journey of Lidar", Retrieved from GIM International: https://www.gim-international.com/content/article/the-multispectral-journey-of-lidar, Jan. 24, 2019.
Kelly et al., "Discrete mode laser diodes with ultra narrow linewidthe emission" Feb. 2007, Electronics Letters, vol. 43, 2 pgs.
Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.
Komljenovic et al., "Widely-Tunable Ring-Resonator Semiconductor Lasers", Review, Jul. 17, 2017, 21 pages.
Kotthaus, S., et al., "Derivation of an urban materials spectral library through emittance and reflectance spectroscopy", ISPRS Journal of Photogrammetry and Remote Sensing, Aug. 2014, vol. 94, 194-212.
Kumar et al., "Intra-data center interconnects, networking, and architectures", Coherent Detection, Optical Fiber Telecommunications VII, Oct. 25, 2019, Science Direct, pp. 627-672.
Li, L., "Time-of-Flight Camera—An Introduction", 2014, TI Technical White Paper, SLOA190B.
Li et al., "Photon-Counting Chirped Amplitude Modulation Lidar with 1.5-GHz Gated InGaAs/InP Apd", IEEE Photonics Technology Letters, Mar. 15, 2015, vol. 27, No. 6, pp. 616-719.
LIDAR vs RADAR: https://4sense.medium.com/lidar-vs-radar-312119b9eac4, 2022, 17 pages.
Lu, Z., "Silicon Photonic Switches for Optical Communication Applications", PhD Thesis. University of British Columbia, Sep. 29, 2017, 165 pages.
Nevlacsil et al., "Multi-channel swept source optical coherence tomography concept based on photonic integrated circuits", Optics Express, Oct. 26, 2020, vol. 28, No. 22, pp. 32468-32482.
PDB450C—Switchable Gain Balanced Amp. Photodetector, InGaAs. (n.d.). Retrieved from Thorlabs: https://www.thorlabs.com/thorproduct.cfm?partnumber=PDB450C.
Pfennigbauer, M et al., "Multi-Wavelength Airborne Laser Scanning", ILMF 2011. New Orleans, Feb. 7-9, 2011.
PI Motion/Positioning, 2018, Retrieved from PI USA: http://www.pi-usa.us/products/PDF_Data/Q-522_Mini_Positioning_Stage_20150203.pdf.
PI USA: Fast Tip/Tilt Platform, 2018, Retrieved from PI USA Active Optics: http://www.pi-usa.us/products/PDF_Data/S335_Fast_Tip-Tilt_Platform.pdf.
Pierrottet et al., "Linear FMCW Laser Radar for Precision Range and Vector Velocity Measurements", MRS Online Proceeding Library Archive, Jan. 2008, pp. 1-9.
Pilot Photonics, Lyra OCS 1000, Optical comb laser module, Retrieved on Nov. 20, 2019 from Pilot Photonics: http://www.pilotphotonics.com/optical-frequency-comb-source/.

(56) References Cited

OTHER PUBLICATIONS

Poulton, C. V. MSC Thesis, "Integrated LIDAR with Optical Phased Arrays in Silicon Photonics", Massachusetts Institute of Technology, Sep. 2016, pp. 95-101.
Poulton, Christopher V. et al., "Coherent Solid-State LIDAR with Silicon Photonic Optical Phased Arrays", pp. 4091-4094, Oct. 15, 2017, Optics Letters, vol. 42, No. 20.
Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).
Royo et al., "An Overview of LIDAR Imaging Systems for Autonomous Vehicles", Appl. Sci., Sep. 30, 2019, 9(19):4093, 37 pages. https://doi.org/10.3390/app9194093.
Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.
Sandborn, Phillip Alan McGinnis, "FMCW Lidar: Scaling to the Chip-Level and Improving Phase-Noise-Limited Performance", Fall 2017, 18 pages.

* cited by examiner

DATA RESOLUTION IN LIDAR SYSTEMS

FIELD

The invention relates to imaging systems. In particular, the invention relates to data refinement in imaging systems.

BACKGROUND

LIDAR systems output a system output signal that is reflected by objects located outside of the LIDAR system. The reflected light returns to the LIDAR system as a system return signal. The LIDAR system combines light from the system return system with a reference signal from a local oscillator to generate a beating signal. The LIDAR system includes electronics that use the beat frequency of the beating signal to determine LIDAR data (radial velocity and/or distance between the LIDAR system and the objects) for sample regions that are illuminated by the system output signal.

Identifying the value of the beat frequency for a real beat signal can be difficult as there is often more than one possible solution for the beat frequency. This ambiguity is often avoided by converting the beating signal from a real form to a complex form that combines an in-phase representation of the beating signal with its quadrature signal. Since the beating signal is represented by two different signals, multiple Analog-to-Digital Converters (ADCs) are often needed for processing of these complex signals. However, Analog-to-Digital Converters (ADCs) are expensive and add complexity to the LIDAR system. As a result, there is a need for LIDAR systems with reduced costs and complexity.

SUMMARY

Operating a LIDAR system includes transmitting a system output signal from the LIDAR system such that a sample region is illuminated by the system output signal. Different portions of the system output signal are transmitted during different data periods. Light that returns to the LIDAR system from the system output signal is combined with light from a reference signal so as to generate beating signals that are each associated with a different one of the data periods. A set of multiple candidate frequencies is generated for each of the data periods. Each of the candidate frequencies for a data period represents a possible beat frequency for the beating signal associated with the data period. The candidate frequencies for a subject one of the data periods are used to identify which of the candidate frequencies for a subject one of the data periods is the beat frequency for the beating signal associated with the subject data period.

Operating a LIDAR system includes transmitting from the LIDAR system a system output signal such that a sample region is illuminated by the system output signal. A subject portion of the system output signal is transmitted during a subject data period. A check portion of the system output signal is transmitted during a check data period. The frequency of the system output signal changes at different rates during the subject data period and the check data period. Light that returns to the LIDAR system from the subject portion of the system output signal is combined with light from a subject reference signal so as to generate a subject beating signal beating at a subject beat frequency. Light that returns to the LIDAR system from the check portion of the system output signal is combined with light from a check reference signal so as to generate a check beating signal beating at a check beat frequency. Multiple subject candidate frequencies are identified and include a subject target frequency at the subject beat frequency and a subject image frequency at the additive inverse of the subject beat frequency. Multiple check candidate frequencies are identified and include a check target frequency at the check beat frequency and a check image frequency at the additive inverse of the check beat frequency. The check candidate frequencies are used to identify which one of the subject candidate frequencies is the subject target frequency.

A LIDAR system is configured to transmit a system output signal such that a sample region is illuminated by the system output signal. A subject portion of the system output signal is transmitted during a subject data period. A check portion of the system output signal is transmitted during a check data period. The frequency of the system output signal changes at different rates during the subject data period and the check data period. The LIDAR system includes a light combiner that combines light that returns to the LIDAR system from the subject portion of the system output signal with light from a subject reference signal so as to generate a subject beating signal beating at a subject beat frequency. The light combiner combines light that returns to the LIDAR system from the check portion of the system output signal with light from a check reference signal so as to generate a check beating signal beating at a check beat frequency. The LIDAR system includes electronics that identify multiple subject candidate frequencies and multiple check candidate frequencies. The multiple subject candidate frequencies include a subject target frequency at the subject beat frequency and a subject image frequency at the additive inverse of the subject beat frequency. The multiple check candidate frequencies include a check target frequency at the check beat frequency and a check image frequency at the additive inverse of the check beat frequency. The electronics are configured to use the check candidate frequencies to identify which one of the subject candidate frequencies is the subject target frequency.

Operating a system includes transmitting from a LIDAR system a system output signal such that a sample region is illuminated by the system output signal. Multiple different candidate LIDAR data results are calculated for the sample region. Each of the different candidate LIDAR data results is a candidate for the radial velocity and/or the distance between the LIDAR system and an object in the sample region. The candidate LIDAR data result that represents the valid LIDAR data for the sample region is identified.

Operating a LIDAR system includes transmitting from the LIDAR system a system output signal such that a sample region is illuminated by the system output signal. A first subject portion of the system output signal is transmitted during a first subject data period. A second subject portion of the system output signal is transmitted during a second subject data period. A check portion of the system output signal is transmitted during a check data period. A frequency of the system output signal changes at different rates during the first subject data period and the second subject data period. Light that returns to the LIDAR system from the first subject portion of the system output signal is combined with light from a first reference signal so as to generate a first subject beating signal beating at a first subject beat frequency. Light that returns to the LIDAR system from the second portion of the system output signal is combined with light from a second reference signal so as to generate a second subject beating signal beating at a second subject beat frequency. Light that returns to the LIDAR system from the check portion of the system output signal is combined with light from a check reference signal so as to generate a check beating signal beating at a check beat frequency. Multiple first subject candidate frequencies are identified. The first subject candidate frequencies include a first subject target frequency at the first subject beat frequency and a first image frequency at the additive inverse of the first subject beat frequency. Multiple second subject candidate frequencies are identified. The second subject candidate frequencies include a second target frequency at the second subject beat frequency and a second image frequency at the additive inverse of the second beat frequency. Multiple check candidate frequencies are identified. The check candidate frequencies include a check target frequency at the check beat frequency and a check image frequency at the additive inverse of the check beat frequency. Multiple candidate frequency pairs are identified. Each candidate frequency pair includes one of the first subject candidate frequencies paired with one of the second subject candidate frequencies. Candidate LIDAR data results are calculated for each one of the candidate frequency pairs. The candidate LIDAR data result for each of the candidate frequency pairs is calculated from the first subject target frequency and the second subject target frequency in the candidate frequency pair. The candidate LIDAR data result for each of the candidate frequency pairs is a candidate for a radial velocity and/or a distance between the LIDAR system and an object in the sample region. The candidate LIDAR data results that were calculated from the first target frequency and the second target frequency are identified.

A system includes a LIDAR system configured to transmit a system output signal such that a sample region is illuminated by the system output signal. A first subject portion of the system output signal is transmitted during a first subject one of the data periods. A second subject portion of the system output signal is transmitted during a second subject one of the data periods. A check portion of the system output signal is transmitted during a check one of the data periods. The frequency of the system output signal changes at different rates during the first subject data period and the second subject data period. A light signal combiner a light signal combiner combines light that returns to the LIDAR system from the first subject portion of the system output signal with light from a first subject portion of a reference signal so as to generate a first subject beating signal beating at a first subject beat frequency. The light signal combiner also combines light that returns to the LIDAR system from the second subject portion of the system output signal with light from a second subject portion of the reference signal so as to generate a second subject beating signal beating at a second subject beat frequency. The light signal combiner also combines light that returns to the LIDAR system from the check portion of the system output signal with light from a check portion of the reference signal so as to generate a check beating signal beating at a check beat frequency. Electronics identify multiple first candidate frequencies, multiple second candidate frequencies, and multiple check candidate frequencies. The first candidate frequencies include a first target frequency at the first subject beat frequency and a first image frequency at the additive inverse of the first subject beat frequency. The second candidate frequencies include a second target frequency at the second beat frequency and a second image frequency at the additive inverse of the second beat frequency. The third candidate frequencies include a third target frequency at the third beat frequency and a third image frequency at the additive inverse of the third beat frequency. The electronics identify multiple candidate frequency pairs and calculate candidate LIDAR data results from each one of the candidate frequency pairs. Each candidate frequency pair includes one of the first candidate frequencies paired with one of the second candidate frequencies. The candidate LIDAR data result for each of the candidate frequency pairs is a candidate for a radial velocity and/or a distance between the LIDAR system and an object in the sample region. The electronics identify which one of the candidate LIDAR data results was calculated from the first target frequency and the second target frequency. The identified candidate LIDAR data results can serve as valid LIDAR data for the sample region.

DESCRIPTION

The LIDAR system transmits a system output signal from the LIDAR system such that a sample region is illuminated by the system output signal. Different portions of the system output signal are transmitted during different data periods. Light that returns to the LIDAR system from the system output signal is combined with light from a reference signal so as to generate beating signals that are each associated with a different one of the data periods. A set of multiple candidate frequencies is calculated for each of the data periods. Each of the candidate frequencies for a data period represents a possible beat frequency for the beating signal associated with that data period. The candidate frequencies for a check one of the data periods are used to identify which of the candidate frequencies for a subject one of the data periods is the correct beat frequency for the beating signal associated with the subject data period. The LIDAR data for the sample region is calculated from the candidate frequency that is identified as the correct beat frequency for the beating signal.

The presence of multiple frequencies that are each a candidate for the actual beat frequency can be a result of processing a real form of the beating signal rather than a complex form of the beating signal. Since the real form of the beating signal excludes the quadrature component for the beating signal, a single Analog-to-Digital Converter (ADC) can replace the multiple Analog-to-Digital Converters that are needed to process complex representations of the beating signal. As a result, the costs and complexity of the LIDAR system are reduced.

Figure 1A:
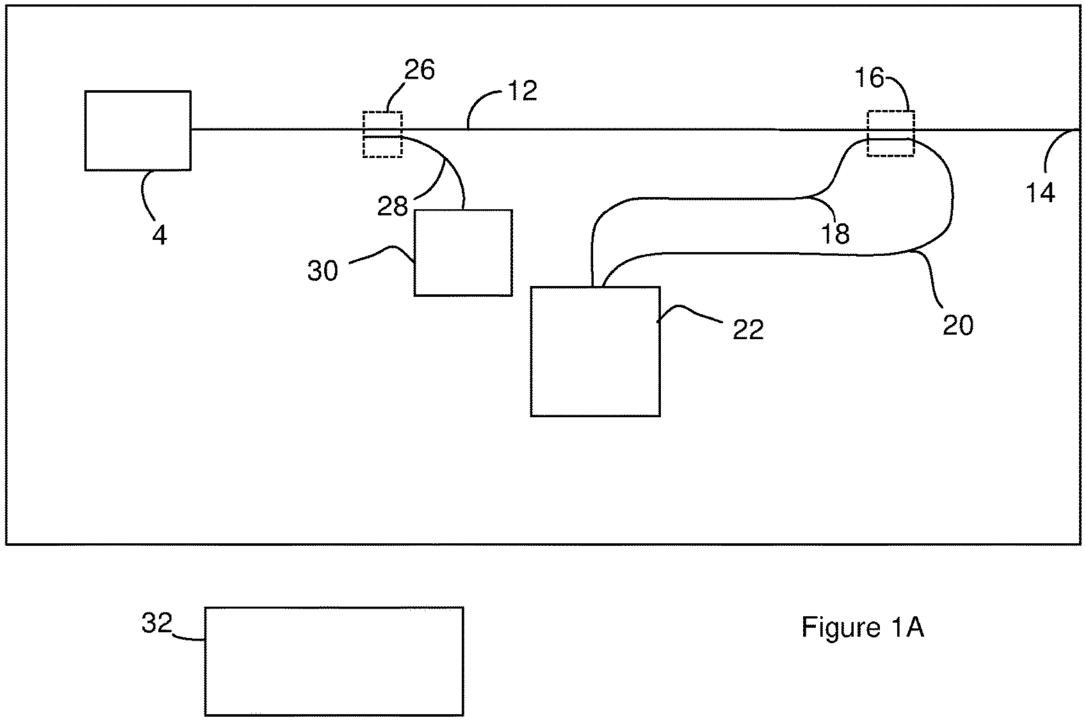
FIG. 1A is a topview of a schematic of a LIDAR system that includes or consists of a LIDAR chip that outputs a LIDAR output signal and receives a LIDAR input signal on a common waveguide.

FIG. 1A is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light source 4 that outputs a preliminary outgoing LIDAR signal. A suitable light source 4 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives an outgoing LIDAR signal from a light source 4. The utility waveguide 12 terminates at a facet 14 and carries the outgoing LIDAR signal to the facet 14. The facet 14 can be positioned such that the outgoing LIDAR signal traveling through the facet 14 exits the LIDAR chip and serves as a LIDAR output signal. For instance, the facet 14 can be positioned at an edge of the chip so the outgoing LIDAR signal traveling through the facet 14 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

The LIDAR output signal travels away from the LIDAR system through free space in the atmosphere in which the LIDAR system is positioned. The LIDAR output signal may be reflected by one or more objects in the path of the LIDAR output signal. When the LIDAR output signal is reflected, at least a portion of the reflected light travels back toward the LIDAR chip as a LIDAR input signal. In some instances, the LIDAR input signal can also be considered a system return signal. As an example, when the exit of the LIDAR output signal from the LIDAR chip is also an exit of the LIDAR output signal from the LIDAR system, the LIDAR input signal can also be considered a system return signal.

The LIDAR input signals can enter the utility waveguide 12 through the facet 14. The portion of the LIDAR input signal that enters the utility waveguide 12 serves as an incoming LIDAR signal. The utility waveguide 12 carries the incoming LIDAR signal to a splitter 16 that moves a portion of the outgoing LIDAR signal from the utility waveguide 12 onto a comparative waveguide 18 as a comparative signal. The comparative waveguide 18 carries the comparative signal to a processing component 22 for further processing. Although FIG. 1A illustrates a directional coupler operating as the splitter 16, other signal tapping components can be used as the splitter 16. Suitable splitters 16 include, but are not limited to, directional couplers, optical couplers, y-junctions, tapered couplers, and Multi-Mode Interference (MMI) devices.

The utility waveguide 12 also carrier the outgoing LIDAR signal to the splitter 16. The splitter 16 moves a portion of the outgoing LIDAR signal from the utility waveguide 12 onto a reference waveguide 20 as a reference signal. The reference waveguide 20 carries the reference signal to the processing component 22 for further processing.

The percentage of light transferred from the utility waveguide 12 by the splitter 16 can be fixed or substantially fixed. For instance, the splitter 16 can be configured such that the power of the reference signal transferred to the reference waveguide 20 is an outgoing percentage of the power of the outgoing LIDAR signal or such that the power of the comparative signal transferred to the comparative waveguide 18 is an incoming percentage of the power of the incoming LIDAR signal. In many splitters 16, such as directional couplers and multimode interferometers (MMIs), the outgoing percentage is equal or substantially equal to the incoming percentage. In some instances, the outgoing percentage is greater than 30%, 40%, or 49% and/or less than 51%, 60%, or 70% and/or the incoming percentage is greater than 30%, 40%, or 49% and/or less than 51%, 60%, or 70%. A splitter 16 such as a multimode interferometer (MMI) generally provides an outgoing percentage and an incoming percentage of 50% or about 50%. However, multimode interferometers (MMIs) can be easier to fabricate in platforms such as silicon-on-insulator platforms than some alternatives. In one example, the splitter 16 is a multimode interferometer (MMI) and the outgoing percentage and the incoming percentage are 50% or substantially 50%. As will be described in more detail below, the processing component 22 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch for controlling operation of the light source 4. The control branch includes a splitter 26 that moves a portion of the outgoing LIDAR signal from the utility waveguide 12 onto a control waveguide 28. The coupled portion of the outgoing LIDAR signal serves as a tapped signal. Although FIG. 1A illustrates a directional coupler operating as the splitter 26, other signal tapping components can be used as the splitter 26. Suitable splitters 26 include, but are not limited to, directional couplers, optical couplers, y-junctions, tapered couplers, and Multi-Mode Interference (MMI) devices.

The control waveguide 28 carries the tapped signal to control components 30. The control components can be in electrical communication with electronics 32. All or a portion of the control components can be included in the electronics 32. During operation, the electronics can employ output from the control components 30 in a control loop configured to control a process variable of one, two, or three loop controlled light signals selected from the group consisting of the tapped signal, the system output signal, and the outgoing LIDAR signal. Examples of the suitable process variables include the frequency of the loop controlled light signal and/or the phase of the loop controlled light signal.

Figure 1B:
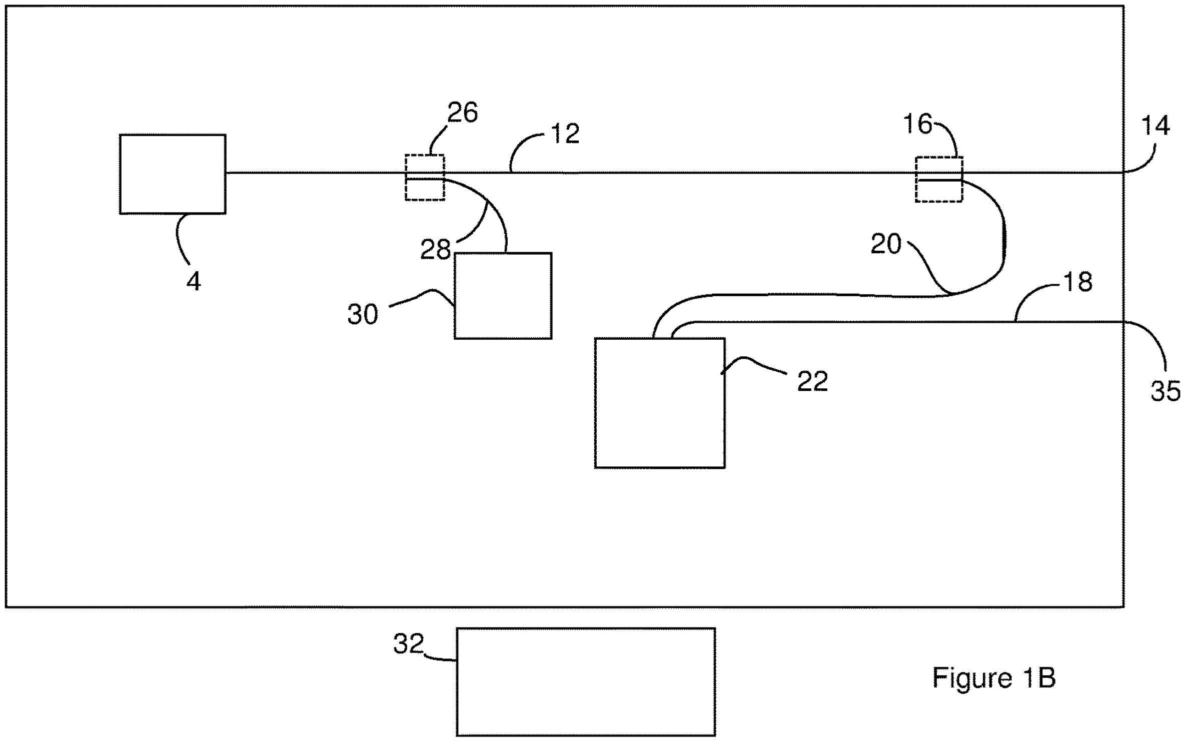
FIG. 1B is a topview of a schematic of a LIDAR system that includes or consists of a LIDAR chip that outputs a LIDAR output signal and receives a LIDAR input signal on different waveguides.

The LIDAR system can be modified so the incoming LIDAR signal and the outgoing LIDAR signal can be carried on different waveguides. For instance, FIG. 1B is a topview of the LIDAR chip of FIG. 1A modified such that the incoming LIDAR signal and the outgoing LIDAR signal are carried on different waveguides. The outgoing LIDAR signal exits the LIDAR chip through the facet 14 and serves as the LIDAR output signal. When light from the LIDAR output signal is reflected by an object external to the LIDAR system, at least a portion of the reflected light returns to the LIDAR chip as a first LIDAR input signal. The first LIDAR input signals enters the comparative waveguide 18 through a facet 35 and serves as the comparative signal. The comparative waveguide 18 carries the comparative signal to a processing component 22 for further processing. As described in the context of FIG. 1A, the reference waveguide 20 carries the reference signal to the processing component 22 for further processing. As will be described in more detail below, the processing component 22 combines the comparative signal with the reference signal to form a composite signal that carries LIDAR data for a sample region on the field of view.

Figure 1C:
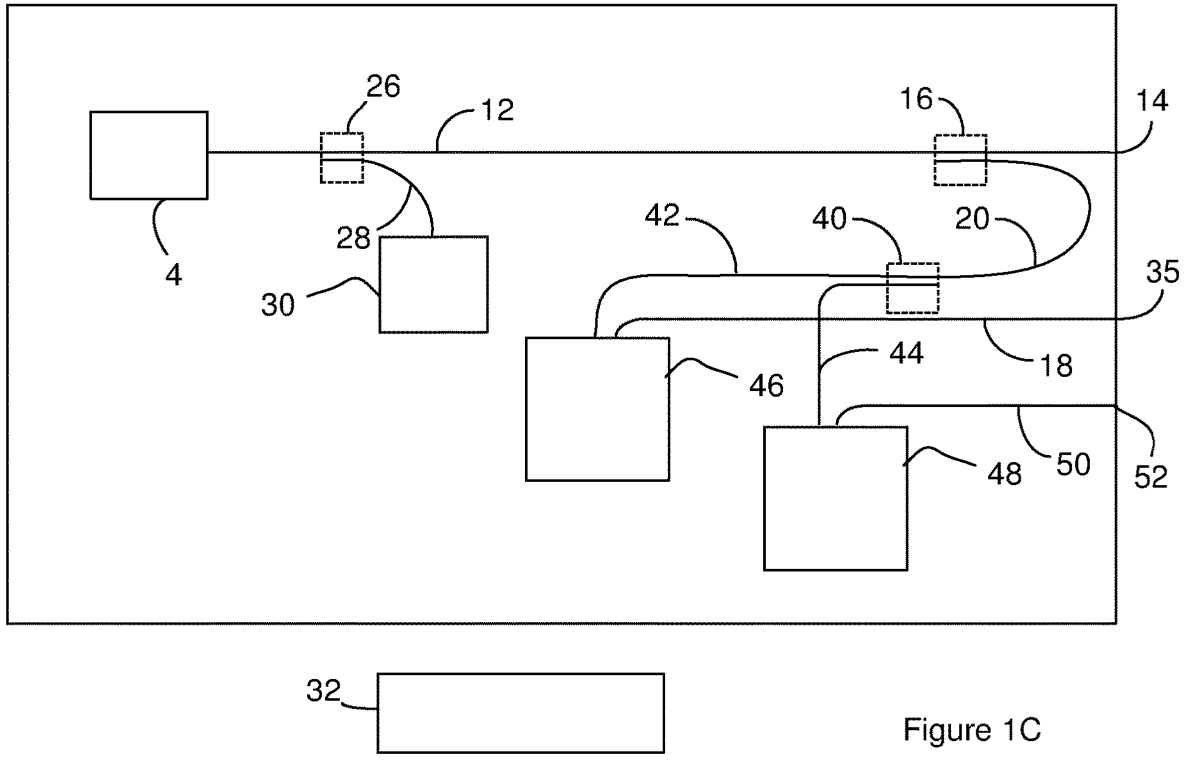
FIG. 1C is a topview of a schematic of another embodiment of a LIDAR system that that includes or consists of a LIDAR chip that outputs a LIDAR output signal and receives multiple LIDAR input signals on different waveguides.

The LIDAR chips can be modified to receive multiple LIDAR input signals. For instance, FIG. 1C illustrates the LIDAR chip of FIG. 1B modified to receive two LIDAR input signals. A splitter 40 is configured to place a portion of the reference signal carried on the reference waveguide 20 on a first reference waveguide 42 and another portion of the reference signal on a second reference waveguide 44. Accordingly, the first reference waveguide 42 carries a first reference signal and the second reference waveguide 44 carries a second reference signal. The first reference waveguide 42 carries the first reference signal to a first processing component 46 and the second reference waveguide 44 carries the second reference signal to a second processing component 48. Examples of suitable splitters 40 include, but are not limited to, y-junctions, optical couplers, and multimode interference couplers (MMIs).

The outgoing LIDAR signal exits the LIDAR chip through the facet 14 and serves as the LIDAR output signal. When light from the LIDAR output signal is reflected by one or more object located external to the LIDAR system, at least a portion of the reflected light returns to the LIDAR chip as a first LIDAR input signal. The first LIDAR input signals enters the comparative waveguide 18 through the facet 35 and serves as a first comparative signal. The comparative waveguide 18 carries the first comparative signal to a first processing component 46 for further processing.

Additionally, when light from the LIDAR output signal is reflected by one or more object located external to the LIDAR system, at least a portion of the reflected signal returns to the LIDAR chip as a second LIDAR input signal. The second LIDAR input signals enters a second comparative waveguide 50 through a facet 52 and serves as a second comparative signal carried by the second comparative waveguide 50. The second comparative waveguide 50 carries the second comparative signal to a second processing component 48 for further processing.

Although the light source 4 is shown as being positioned on the LIDAR chip, the light source 4 can be located off the LIDAR chip. For instance, the utility waveguide 12 can terminate at a second facet through which the outgoing LIDAR signal can enter the utility waveguide 12 from a light source 4 located off the LIDAR chip.

In some instances, a LIDAR chip constructed according to FIG. 1B or FIG. 1C is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view.

Figure 2:
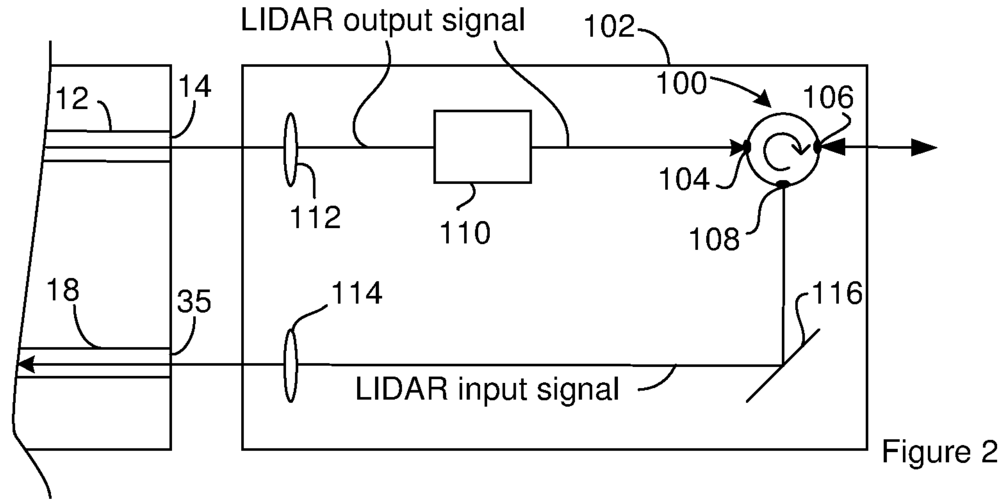
FIG. 2 is a topview of an example of a LIDAR adapter that is suitable for use with the LIDAR chip of FIG. 1B.

An example of a LIDAR adapter that is suitable for use with the LIDAR chip of FIG. 1B is illustrated in FIG. 2. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR system. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR system, the LIDAR output signal can also be considered a system output signal.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 2 illustrates the LIDAR output signal and the system return signal traveling between the LIDAR adapter and the sample region along the same optical path.

The system return signal exits the circulator 100 through the third port 108 and is directed to the comparative waveguide 18 on the LIDAR chip. Accordingly, all or a portion of the system return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 2, the LIDAR adapter can include optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the electronics 32 allowing the electronics 32 to control the power of the LIDAR output signal.

FIG. 2 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 35 of the comparative waveguide 18.

The LIDAR adapter can also include one or more direction changing components such as mirrors. FIG. 2 illustrates the LIDAR adapter including a mirror as a direction-changing component 116 that redirects the system return signal from the circulator 100 to the facet 20 of the comparative waveguide 18.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR system can be configured to compensate for polarization. Light from a laser source is typically linearly polarized and hence the LIDAR output signal is also typically linearly polarized. Reflection from an object may change the angle of polarization of the returned light. Accordingly, the system return signal can include light of different linear polarization states. For instance, a first portion of a system return signal can include light of a first linear polarization state and a second portion of a system return signal can include light of a second linear polarization state. The intensity of the resulting composite signals is proportional to the square of the cosine of the angle between the comparative and reference signal polarization fields. If the angle is 90 degrees, the LIDAR data can be lost in the resulting composite signal. However, the LIDAR system can be modified to compensate for changes in polarization state of the LIDAR output signal.

Figure 3:
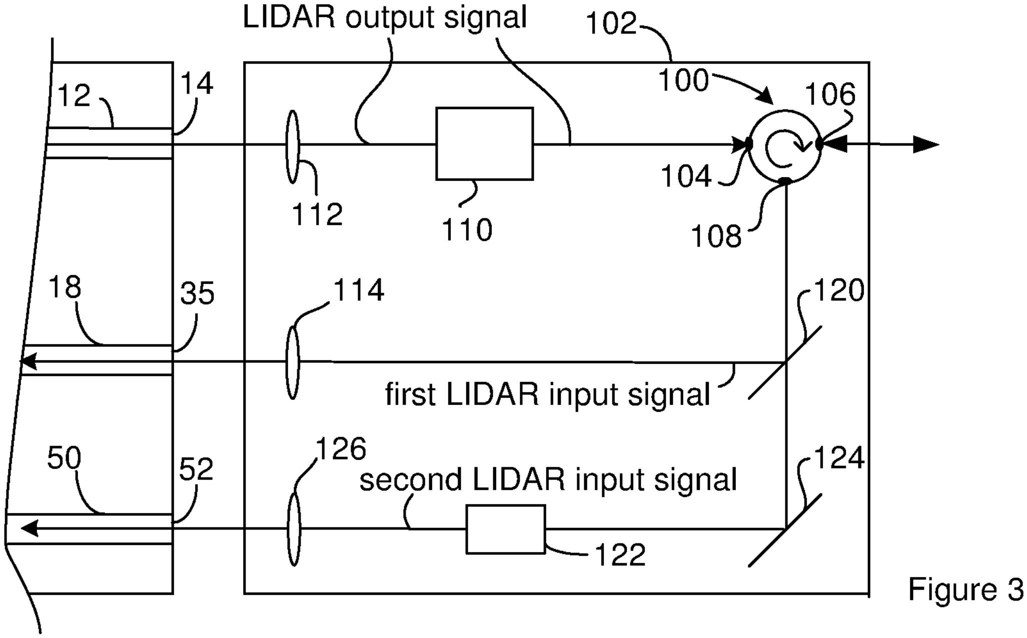
FIG. 3 is a topview of an example of a LIDAR adapter that is suitable for use with the LIDAR chip of FIG. 1C.

FIG. 3 illustrates the LIDAR system of FIG. 3 modified such that the LIDAR adapter is suitable for use with the LIDAR chip of FIG. 1C. The LIDAR adapter includes a beamsplitter 120 that receives the system return signal from the circulator 100. The beamsplitter 120 splits the system return signal into a first portion of the system return signal and a second portion of the system return signal. Suitable beamsplitters include, but are not limited to, Wollaston prisms, and MEMS-based beamsplitters.

The first portion of the system return signal is directed to the comparative waveguide 18 on the LIDAR chip and serves as the first LIDAR input signal described in the context of FIG. 1C. The second portion of the system return signal is directed a polarization rotator 122. The polarization rotator 122 outputs a second LIDAR input signal that is directed to the second input waveguide 76 on the LIDAR chip and serves as the second LIDAR input signal.

The beamsplitter 120 can be a polarizing beam splitter. One example of a polarizing beamsplitter is constructed such that the first portion of the system return signal has a first polarization state but does not have or does not substantially have a second polarization state and the second portion of the system return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 122 shown in FIG. 3 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 3, the first comparative signals, the second comparative signals, the first reference signals, and the second reference signals can each have light of the first polarization state.

As a result of the above configuration, first composite signals generated by the first processing component 46 and second composite signals generated by the second processing component 48 each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e. first composite signals and the second composite signal) from the sample region. In some instances, determining the LIDAR data for the sample region includes the electronics combining the LIDAR data from different composite signals (i.e. the composite signals and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 3 is described in the context of components being arranged such that the first comparative signals, the second comparative signals, the first reference signals, and the second reference signals each have the first polarization state, other configurations of the components in FIG. 3 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the system return signal has the first polarization state and the first portion of the system return signal has the second polarization state, the polarization rotator receives the first portion of the system return signal, and the outgoing LIDAR signal can have the second polarization state. In this example, the first LIDAR input signal and the second LIDAR input signal each has the second polarization state.

The above system configurations result in the first portion of the system return signal and the second portion of the system return signal being directed into different composite signals. As a result, since the first portion of the system return signal and the second portion of the system return signal are each associated with a different polarization state but electronics can process each of the composite signals, the LIDAR system compensates for changes in the polarization state of the LIDAR output signal in response to reflection of the LIDAR output signal.

The LIDAR adapter of FIG. 3 can include additional optical components including passive optical components. For instance, the LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 52 of the second comparative waveguide 50. The LIDAR adapter also includes one or more direction changing components 124 such as mirrors and prisms. FIG. 3 illustrates the LIDAR adapter including a mirror as a direction changing component 124 that redirects the second portion of the system return signal from the circulator 100 to the facet 52 of the second comparative waveguide 50 and/or to the third lens 126.

Figure 4:
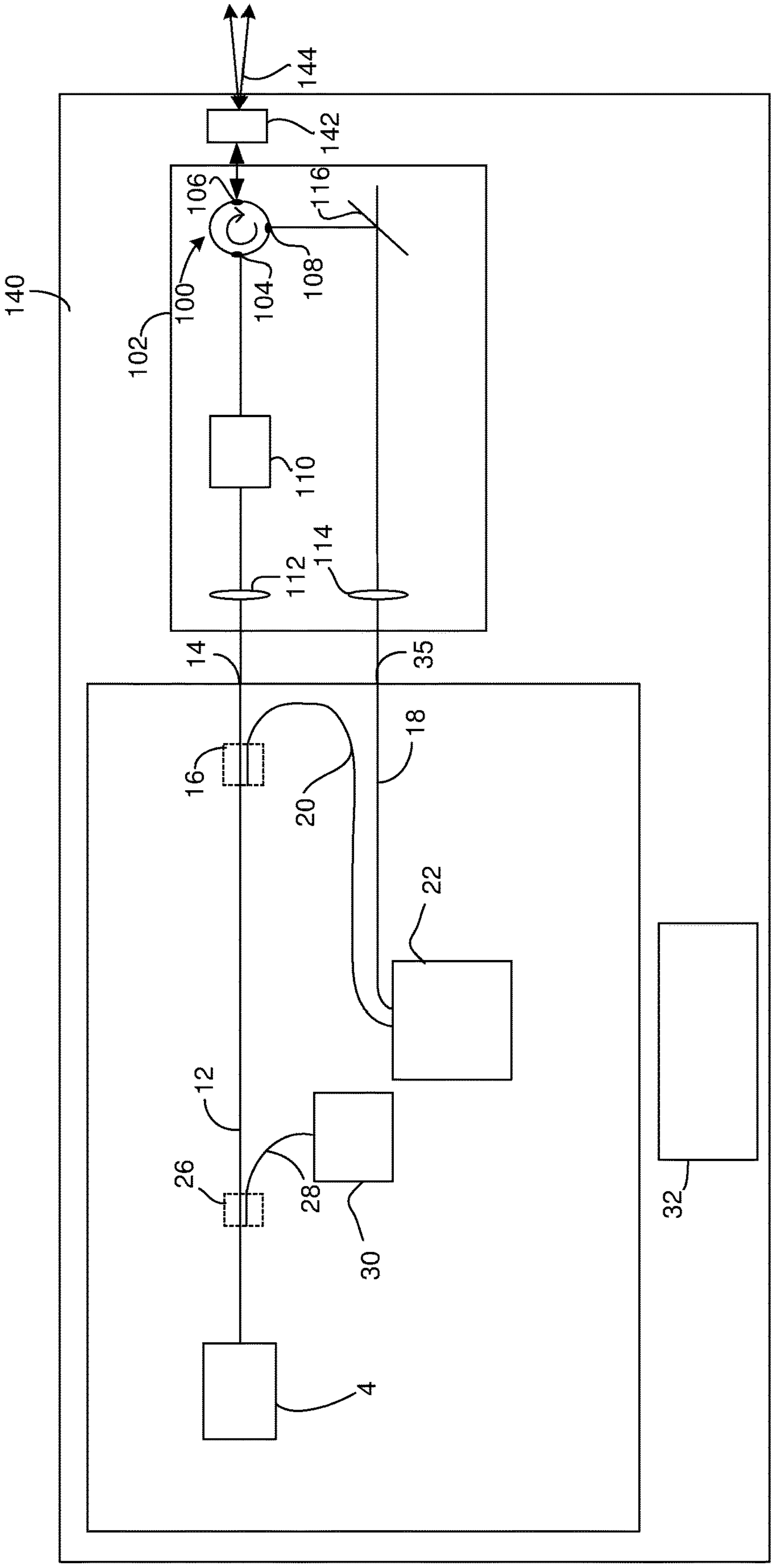
FIG. 4 is a topview of an example of a LIDAR system that includes the LIDAR chip of FIG. 1A and the LIDAR adapter of FIG. 2 on a common support.

When the LIDAR system includes a LIDAR chip and a LIDAR adapter, the LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR system that includes the LIDAR chip and electronics 32 of FIG. 1A and the LIDAR adapter of FIG. 2 on a common support 140. Although the electronics 32 are illustrated as being located on the common support, all or a portion of the electronics can be located off the common support. When the light source 4 is located off the LIDAR chip, the light source can be located on the common support 140 or off of the common support 140. Suitable approaches for mounting the LIDAR chip, electronics, and/or the LIDAR adapter on the common support include, but are not limited to, epoxy, solder, and mechanical clamping.

The LIDAR systems can include components including additional passive and/or active optical components. For instance, the LIDAR system can include one or more components that receive the LIDAR output signal from the LIDAR chip or from the LIDAR adapter. The portion of the LIDAR output signal that exits from the one or more components can serve as the system output signal. As an example, the LIDAR system can include one or more beam steering components that receive the LIDAR output signal from the LIDAR chip or from the LIDAR adapter and that output all or a fraction of the LIDAR output signal that serves as the system output signal. For instance, FIG. 4 illustrates a beam steering component 142 that receive a LIDAR output signal from the LIDAR adapter. Although FIG. 4 shows the beam steering component positioned on the common support 140, the beam steering component can be positioned on the LIDAR chip, on the LIDAR adapter, off the LIDAR chip, or off the common support 140. Suitable beam steering components include, but are not limited to, movable mirrors, MEMS mirrors, optical phased arrays (OPAs), and actuators that move the LIDAR chip, LIDAR adapter, and/or common support.

The electronics can operate the one or more beam steering component 142 so as to steer the system output signal to different sample regions 144. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

Figure 5A:
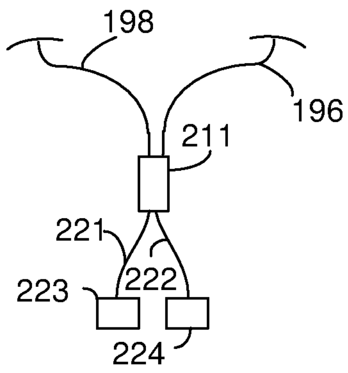
FIG. 5A illustrates an example of a processing component suitable for use with the LIDAR systems.
Figure 5B:
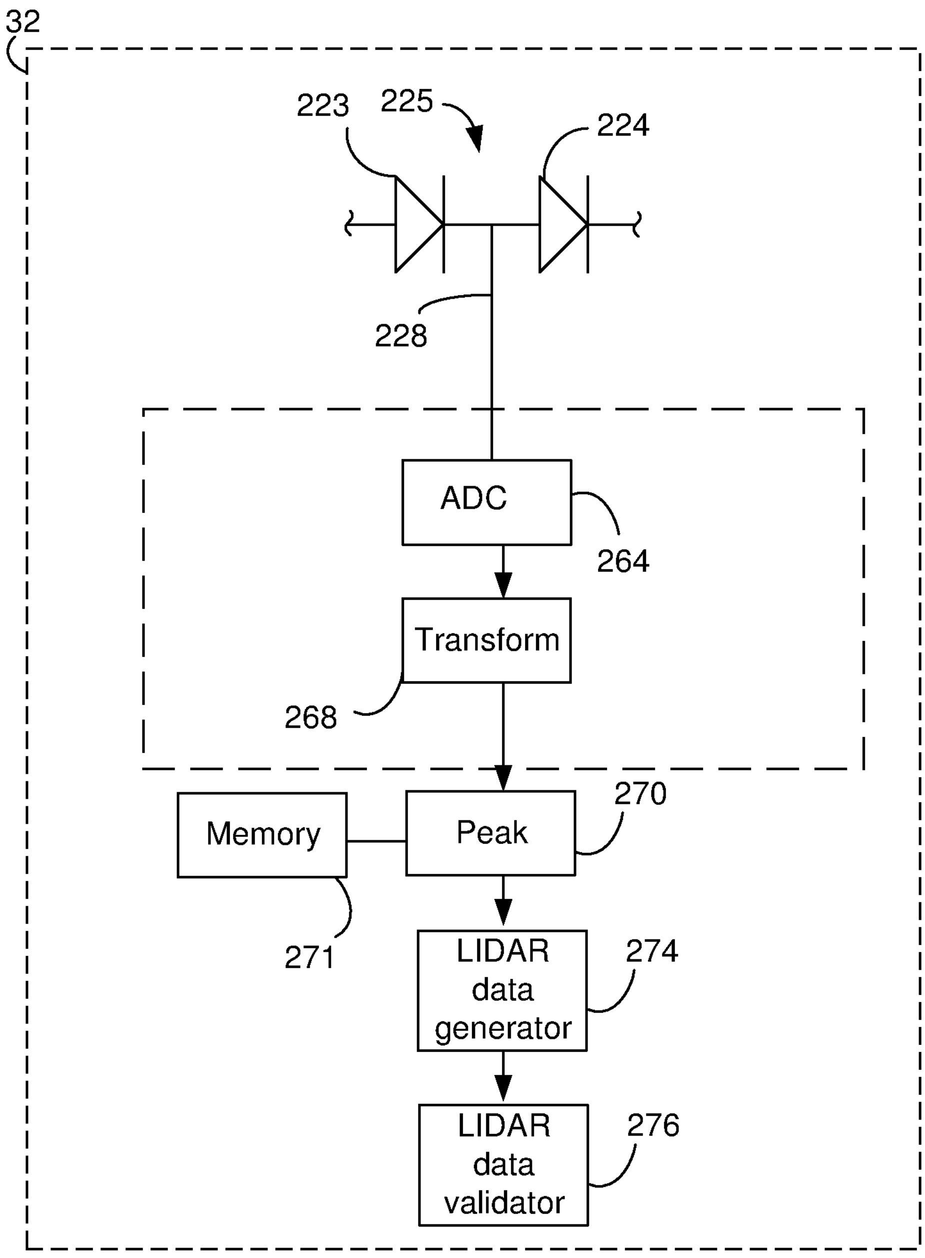
FIG. 5B provides a schematic of electronics that are suitable for use with a processing component constructed according to FIG. 5A.
Figure 5C:
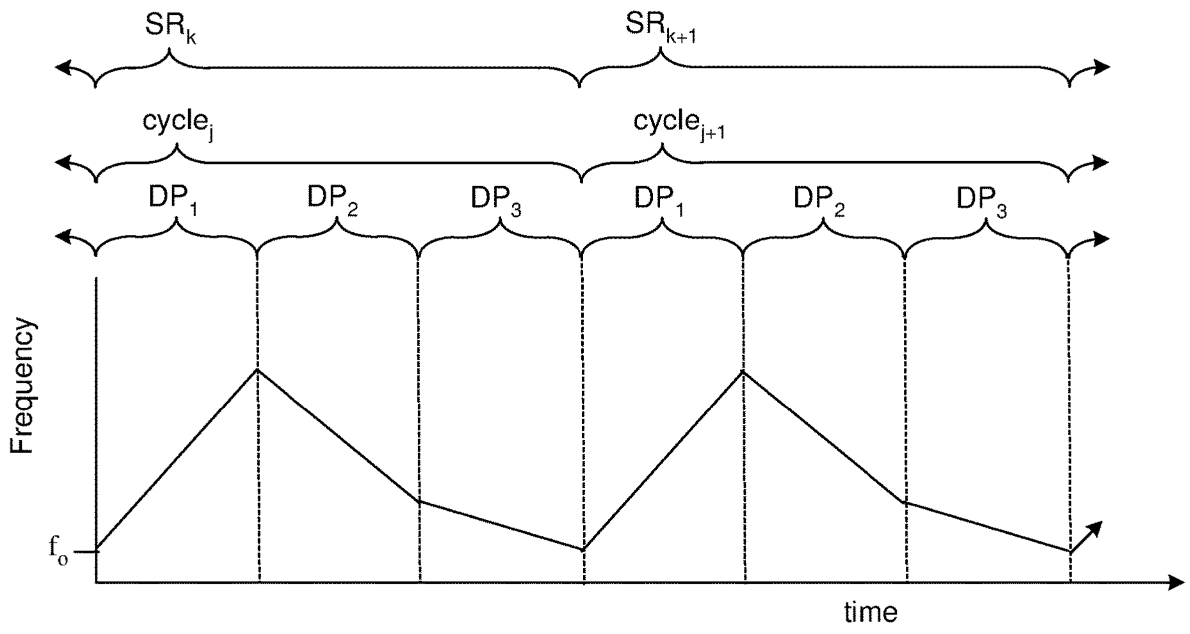
FIG. 5C is a graph of frequency versus time for a system output signal.

FIG. 5A through FIG. 5C illustrate an example of a suitable processing component for use as all or a fraction of the processing components selected from the group consisting of the processing component 22, the first processing component 46 and the second processing component 48. The processing component receives a comparative signal from a comparative waveguide 196 and a reference signal from a reference waveguide 198. The comparative waveguide 18 and the reference waveguide 20 shown in FIG. 1A and FIG. 1B can serve as the comparative waveguide 196 and the reference waveguide 198, the comparative waveguide 18 and the first reference waveguide 42 shown in FIG. 1C can serve as the comparative waveguide 196 and the reference waveguide 198, or the second comparative waveguide 50 and the second reference waveguide 44 shown in FIG. 1C can serve as the comparative waveguide 196 and the reference waveguide 198.

The comparative waveguide 196 carries the comparative signal to the light signal combiner 211. The reference waveguide 198 carries the reference signal to the light signal combiner 211. The first light signal combiner 211 combines the comparative signal and the reference signal into a first composite signal. Due to the difference in frequencies between the comparative signal and the reference signal, the first composite signal is beating between the comparative signal and the reference signal.

The first light signal combiner 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light signal combiner 211 splits the first composite signal such that the portion of the comparative signal included in the first portion of the composite signal is phase shifted by 180° relative to the portion of the comparative signal in the second portion of the composite signal but the portion of the reference signal in the first portion of the composite signal is not phase shifted relative to the portion of the reference signal in the second portion of the composite signal. Alternately, the light signal combiner 211 splits the composite signal such that the portion of the reference signal in the first portion of the composite signal is phase shifted by 180° relative to the portion of the reference signal in the second portion of the composite signal but the portion of the comparative signal in the first portion of the composite signal is not phase shifted relative to the portion of the comparative signal in the second portion of the composite signal.

The first light sensor 223 and the second light sensor 224 can be connected as a balanced detector. For instance, FIG. 5B provides a schematic of the relationship between the electronics, the first light sensor 223, and the second light sensor 224. The symbol for a photodiode is used to represent the first light sensor 223 and the second light sensor 224 but one or more of these sensors can have other constructions. In some instances, all of the components illustrated in the schematic of FIG. 5B are included on the LIDAR chip. In some instances, the components illustrated in the schematic of FIG. 5B are distributed between the LIDAR chip and electronics located off of the LIDAR chip.

The electronics connect the first light sensor 223 and the second light sensor 224 as a first balanced detector 225. In particular, the first light sensor 223 and the second light sensor 224 are connected in series. The serial connection in the first balanced detector is in communication with a first data line 228 that carries the output from the first balanced detector as a first data signal. The first data signal is an electrical representation of the first composite signal.

Accordingly, the first data signal includes a contribution from a first waveform and a second waveform. The first data signal is beating as a result of the beating between the comparative signal and the reference signal. Other light detectors can be used in place of the balanced detector. For instance, a single photodiode can replace the balanced detector.

The electronics 32 includes a transform mechanism 238 configured to perform a mathematical transform on the first data signal. For instance, the mathematical transform can be a real Fourier transform with the first data signal as a real input. Since the transform operates on a real signal rather than a complex signal, the first data signal can be an electrical in-phase representation of the composite signal and can exclude a quadrature signal.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The first digital data signal is a digital representation of the first data signal.

The transform mechanism 238 includes a transform component 268 that receives the first data signal from the first Analog-to-Digital Converter (ADC) 264 as an input. The transform component 268 can be configured to perform a mathematical transform on the first data signal so as to convert from the time domain to the frequency domain. The mathematical transform can be a real transform such as a real Fast Fourier Transform (FFT). A real transform such as a real Fast Fourier Transform (FFT) provides an output with one or more frequency peaks. The electronics use the one or more frequency peaks output from the transform component 268 for further processing to generate the LIDAR data (distance and/or radial velocity between the reflecting object and the LIDAR chip or LIDAR system). The transform component 268 can execute the attributed functions using firmware, hardware or software or a combination thereof.

The electronics 32 includes a peak finder 270 that receives output from the transform component 268. The peak finder 270 is configured to find a peak in the output of the transform component 268 in order to identify the beat frequency of the composite optical signal. In some instances, the peak finder is configured such that the identified peak frequencies each have a magnitude above a threshold selected to reduce noise and/or prevent false peak frequencies. In some instances, the peak finder 270 can store the peak frequencies in a memory 271 for later use by a LIDAR data generator 274. The LIDAR data generator 274 uses the peak frequencies to generate the LIDAR data (distance and/or radial velocity between the reflecting object and the LIDAR chip or LIDAR system). Suitable memories 271 include, but are not limited to, buffers. The peak finder 270 can execute the attributed functions using firmware, hardware or software or a combination thereof.

The electronics tune the frequency of the system output signal over time. The system output signal has a frequency versus time pattern with a repeated cycle. FIG. 5C shows an example of a suitable frequency versus time pattern for the system output signal. The base frequency of the system output signal ($f_o$) can be the frequency of the system output signal at the start of a cycle.

FIG. 5C shows frequency versus time for a sequence of two cycles labeled $cycle_j$ and $cycle_{j+1}$ where j represents a cycle index. In some instances, the frequency versus time pattern is repeated in each cycle as shown in FIG. 5C. The illustrated cycles do not include re-location periods and/or re-location periods are not located between cycles. As a result, FIG. 5C illustrates the results for a continuous scan.

Each cycle includes M data periods that are each associated with a period index m and are labeled $DP_m$. Suitable values for M include M≥2. In the example of FIG. 5C, M=3. As a result, each cycle includes three data periods labeled $DP_m$ with m=1, 2, and 3. In some instances, the frequency versus time pattern is the same for the data periods that correspond to each other in different cycles as is shown in FIG. 5C. Corresponding data periods are data periods with the same period index. As a result, each data period $DP_1$ can be considered corresponding data periods and the associated frequency versus time patterns are the same in FIG. 5C. At the end of a cycle, the electronics return the frequency to the same frequency level at which it started the previous cycle.

During the data period $DP_m$, the electronics can operate the light source such that the frequency of the system output signal changes linearly as a function of time. For instance, during data period $DP_m$, the frequency of the system output signal can change at a constant or substantially constant rate $\alpha_m$ (the chirp rate). The chirp rate can continue for all or a portion of the duration of the data period. For instance, during the data periods labeled $DP_1$ the electronics operate the light source such that the frequency of the system output signal changes at a linear rate $\alpha_1$, during the data periods labeled $DP_2$ the electronics operate the light source such that the frequency of the system output signal changes at a linear rate $\alpha_2$ and during the data periods labeled $DP_3$ the electronics operate the light source such that the frequency of the system output signal changes at a linear rate $\alpha_3$.

The data periods associated with a sample region include multiple subject data periods and at least one check data period. In FIG. 5C, the $DP_1$ and $DP_2$ associated with each sample region can serve as subject sample regions and the $DP_3$ associated with the sample region can serve as a check data period. The rate of change in the frequency of the system output signal during data period m ($\alpha_m$) can be different for each of the subject data periods. In some instances, $\alpha_1$ through $\alpha_M$ are selected such that the sum of $\alpha_1$ through $\alpha_M$ is zero. For instance, when M is equal to three, $\alpha_1$, $\alpha_2$, and $\alpha_3$ can be selected such that $\alpha_1+\alpha_2+\alpha_3=0$ as shown in FIG. 5C. When $\alpha_1+\alpha_2+\alpha_3=0$, the frequency returns to the same frequency level at which it started the previous cycle. In some instances of $\alpha_0>0$, $\alpha_2<0$, and $\alpha_3\neq0$ or $\alpha_1<0$, $\alpha_2>0$, and $\alpha_3\neq0$ or $\alpha_3=0$. In some instances, the rate of change in the frequency of the system output signal during a check data period is non-zero.

Different portions of the system output signal are transmitted from the LIDAR system during different data periods. For instance, a first subject portion of the system output signal can be transmitted during a first subject data period (m=1 in the example of FIG. 5C). A second subject portion of the system output signal can be transmitted during a second subject data period (m=2 in the example of FIG. 5C). A check portion of the system output signal is transmitted during a check data period (m=2 in the example of FIG. 5C). The different portions of the system output signal can be combined with different portions of the reference signal to generate the composite signals that are beating at a beat frequency. For instance, light that returns to the LIDAR system from the first subject portion of the system output signal can be combined with light from a first subject portion of a reference signal so as to generate a first subject beating signal beating at a first subject beat frequency. Light that returns to the LIDAR system from the second subject portion of the system output signal can be combined with light from a second subject portion of the reference signal so as to generate a second subject beating signal beating at a second subject beat frequency. Light that returns to the LIDAR system from the check portion of the system output signal can be combined with light from a check portion of the reference signal so as to generate a check beating signal beating at a check beat frequency.

Although FIG. 5C illustrates two subject data periods, a sample region can be illuminated by a system output signal for more than two subject data periods. Accordingly, in some instances, a cycle includes more than two subject data periods or as few as one. The rate of change in the frequency of the system output signal during a check data period can be different from the rate of change in the frequency of the system output signal for all or a portion of the subject data periods. Accordingly, the rate of change in the frequency of the system output signal during each of the data periods associated with the same sample region can be different.

The frequency of the system output signal can increase during one of the subject data periods associated with a sample region as is evident from the data period $DP_1$ of FIG. 5C. The beat frequency of the composite signal in a subject data period where the frequency of the system output signal increases (increasing data period) can be represented by $f_{ub}$ and the rate of increase can be written as dub. As a result, in the example of FIG. 5C, $f_1=f_{ub}$ and $\alpha_1=\alpha_{ub}$. The frequency of the system output signal can decrease during one of the subject data periods associated with the same sample region as is evident from the data period $DP_2$ of FIG. 5C. The beat frequency of the composite signal in a data period where the frequency of the system output signal decreases can be represented by $f_{db}$ and the rate of decrease can be written as @db. As a result, in the example of FIG. 5C, $f_2=f_{db}$ and $\alpha_2=\alpha_{db}$.

FIG. 5C labels sample regions that are each associated with a sample region index k and are labeled $SR_k$. FIG. 5C labels sample regions $SR_k$ through $SR_{k+1}$. Each sample region is illuminated with the system output signal during the data periods that FIG. 5C shows as associated with the sample region. For instance, sample region $SR_{k+1}$ is illuminated with the system output signal during the data periods labeled $DP_1$, $DP_2$, and $DP_3$ within cycle j+1. Accordingly, the sample region labeled $SR_{k+1}$ is associated with the data periods labeled $DP_1$ through $DP_3$ within cycle j+1. The sample region indices k can be assigned relative to time. For instance, the sample regions can be illuminated by the system output signal in the sequence indicated by the index k. As a result, the sample region $SR_{10}$ can be illuminated after sample region $SR_9$ and before $SR_{11}$. Although FIG. 5C illustrates a single sample region illuminated during a cycle, multiple different sample regions can be illuminated during a cycle.

Figure 5D:
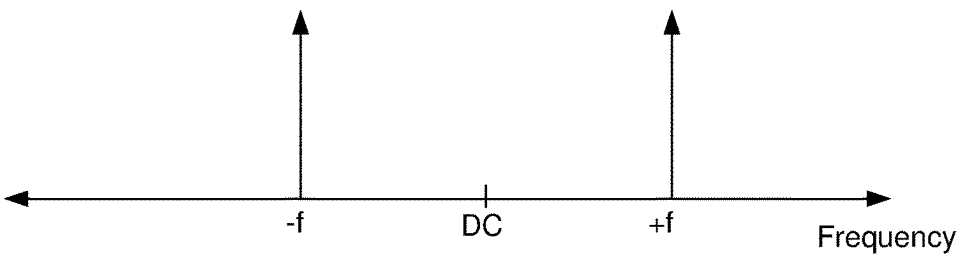
FIG. 5D illustrates a frequency spectrum having corresponding frequency peaks at +f and −f.

Each object illuminated by a system output signal results in a set of frequency peaks in the frequency spectrum. For instance, a composite signal can result in a real Fourier transform outputting multiple different peak frequencies that are each separated from the DC frequency by the same amount. As an example, FIG. 5D is an example frequency spectrum that can be output from a mathematical transform. The frequency spectrum shows power versus frequency. The frequency spectrum illustrates a frequency peak at +f relative to the DC frequency and another corresponding frequency peak at −f relative to the DC frequency. One of these frequency peaks is at the beat frequency of the composite signal and serves as a target beat frequency. One of these frequency peaks is at the additive inverse of the beat frequency of the composite signal and serves as an image beat frequency. It is often unclear which of the beat frequencies represents the target beat frequency and which of the beat frequencies represents the image beat frequency. As will be described below, the beat frequencies during one of the check data periods in each cycle can be used to identify which of the frequency peaks represents the target beat frequency.

Figure 5E:
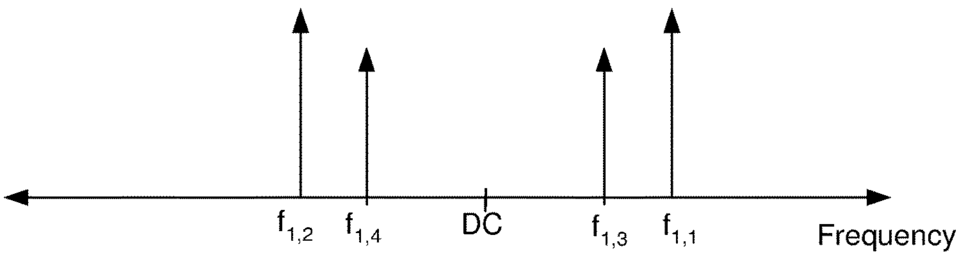
FIG. 5E illustrates a frequency spectrum having pairs of corresponding frequency peaks that each results from the presence of a different object in a sample region of a LIDAR system's field of view.

In circumstances where multiple different objects are present in a sample region, the peak finder can output multiple sets of frequency peaks that are each associated with a different one of the objects. As a result, the frequency spectrum can include multiple target beat frequencies and multiple image beat frequencies. Each of the peak frequencies output from the peak finder can be a candidate for one of the target beat frequencies. The candidate frequencies can be represented by $f_{m,n}$ where m represents a period index and n represents the index of the frequency peak within data period m. As an example, FIG. 5E illustrates a possible frequency spectrum. The frequency spectrum has four frequency peaks at $f_{m,1}$, $f_{m,2}$, $f_{m,3}$, and $f_{m,4}$. The frequency peaks at $f_{m,1}$, and $f_{m,2}$ are corresponding frequency peaks and the frequency peaks at $f_{m,3}$, and $f_{m,4}$ are corresponding frequency peaks.

As is evident from the period index m in the candidate frequencies ($f_{m,n}$), when one of more objects is present in the sample region illuminated during data period m, each of the data periods is associated with a set of candidate frequencies that include at least one target beat frequency and at least one image beat frequency. For instance, when the system output signal has a frequency versus time pattern according to FIG. 5C, the first subject data period (m=1) can be associated with multiple first subject candidate frequencies that include a first subject target frequency at a first subject beat frequency and a first subject image frequency at the additive inverse of the first subject beat frequency. The second subject data period (m=2) can be associated with multiple second subject candidate frequencies that include a second subject target frequency at the second subject beat frequency and a second subject image frequency at the additive inverse of the second subject beat frequency. The check data period (m=3) can be associated with multiple check candidate frequencies that include a check target frequency at the check beat frequency and a check image frequency at the additive inverse of the check beat frequency.

The number of candidate frequencies that occur in data period m (i.e. $f_{m,1}$, $f_{m,2}$, and $f_{m,3}$, and $f_{m,4}$ in FIG. 5E) is equal to double the number of object that are likely present in the sample region ($N_o=2$ in FIG. 5E). The candidate frequencies from different subject data periods can be grouped into candidate frequency pairs. There can be $(2(N_o))^2$ candidate frequency pairs where $N_o$ represents the number of objects that believed to be in the sample region as indicated by the output of the peak finder. Each candidate frequency pair includes a candidate frequency from two different subject data periods. For instance, when subject data period m=1 results in candidate frequencies at $f_{1,1}$, $f_{1,2}$, $f_{1,3}$, and $f_{1,4}$ subject data period m=2 results in candidate frequencies at $f_{2,1}$, $f_{2,2}$, $f_{2,3}$, and $f_{2,4}$; $N_o=2$ and there are 16 candidate frequency pairs at $(f_{1,1}, f_{2,1})$, $(f_{1,1}, f_{2,2})$, $(f_{1,1}, f_{2,3})$, $(f_{1,1}, f_{2,4})$, $(f_{1,2}, f_{2,1})$, $(f_{1,2}, f_{2,2})$, $(f_{1,2}, f_{2,3})$, $(f_{1,2}, f_{2,4})$, $(f_{1,3}, f_{2,1})$, $(f_{1,3}, f_{2,2})$, $(f_{1,3}, f_{2,3})$, $(f_{1,3}, f_{2,4})$, $(f_{1,4}, f_{2,1})$, $(f_{1,4}, f_{2,2})$, $(f_{1,4}, f_{2,3})$, and $(f_{1,4}, f_{2,4})$. Each of the candidate frequency pairs can be associated with a pair index i'. For instance, each candidate frequency pair can be written as $P_{i'}$ where i' has a value from 1 to $(2(N_o))^2$. As an example, the above candidate frequency pairs can extend from $P_1=(f_{1,1}, f_{2,1})$ to $P_{I'}=(f_{1,1}, f_{2,1})$ where $I'=(2(N_o))^2$. Each candidate frequency pair is potentially the correct beat frequency caused by an object during data period m=1 paired with the correct beat frequency caused by the same object during data period m=2. Accordingly, there are $N_o$ valid candidate frequency pairs that each serves as a valid frequency pair.

The beat frequencies from two or more different data periods that are associated with the same sample region can be combined to generate the LIDAR data for that sample region. For instance, the beat frequency determined from $DP_1$ during the illumination of sample region $SR_k$ can be combined with the beat frequency determined from $DP_2$ during the illumination of sample region $SR_k$ to determine the LIDAR data for sample region $SR_k$. As an example, the beat frequency during data period $DP_m$ can be written as the following Equation 1:

$$f_m = 2\alpha_m R/c - 2v/\lambda$$

where m is period index, R represents the distance between the LIDAR system and the object, c represents the speed of light, ν represents the radial velocity between the reflecting object and the LIDAR system, λ represents the wavelength of the system output signal, and the direction from the reflecting object toward the LIDAR system is assumed to be the positive direction.

In the above Equation 1 ($f_m=2\alpha_m R/c-2v/\lambda$), the values of ν and R are unknown. As a result, the results of Equation 1 from two different data periods associated with the sample region can be used to calculate the values of ν and R for the sample region. Solving these equations for the distance between the LIDAR system and the object (R) provides Equation 2:

$$R = c(f_{ub} - f_{db})/(2(\alpha_{ub} - \alpha_{db})).$$

Additionally, solving these equations for the radial velocity between the reflecting object and the LIDAR system (ν) provides Equation 3:

$$v = \lambda(\alpha_{db} f_{ub} - \alpha_{ub} f_{db})/(2(\alpha_{ub} - \alpha_{db})).$$

As shown in FIG. 5B, the electronics include a LIDAR data generator 274 that receives the beat frequencies from the memory 271 and/or peak finder 270. The LIDAR data generator 274 can use Equation 2 and Equation 3 to calculate LIDAR data for each of the candidate frequency pairs. For instance, when the system output signal has a frequency versus time pattern according to FIG. 5C, the $f_{1,n}$ (m=1) value in each candidate frequency pair can serve as $f_{ub}$ in Equation 2 and/or Equation 3 and the $f_{2,n}$ (m=1) value in the candidate frequency pair can serve as $f_{db}$ in Equation 2 and/or Equation 3. As a result, the LIDAR data generator 274 can calculate a candidate distance and/or a candidate radial velocity (R and/or ν) for each of the candidate frequency pairs. As a result, each candidate frequency pair ($P_{i'}$) for a sample region is associated with a candidate distance ($R_{i'}$) and/or a candidate radial velocity ($v_{i'}$). The candidate distance and/or candidate radial velocity ($R_{i'}$ and/or $v_{i'}$) for a candidate frequency pair can represent candidate LIDAR data for the sample region. The candidate LIDAR data is potentially the LIDAR data for the sample region that is illuminated during the data periods that are the source of $f_{ub}$, $f_{db}$, and $f_{chk}$. The LIDAR data generator 274 can execute the attributed functions using firmware, hardware or software or a combination thereof.

The electronics can include a LIDAR data validator 276 that receives the candidate LIDAR data from the LIDAR data generator 274. The LIDAR data validator 276 can also receive peak frequencies such as check period peak frequencies ($f_{chk,n}$) from the memory 271 and/or peak finder 270. When the system output signal has a frequency versus time pattern according to FIG. 5C, the data periods labeled $DP_3$ can serve as check data periods. As a result, the $f_{3,n}$ (m=3) values can each serve as the check period beat frequencies ($f_{chk,n}$). When there are likely two objects present in the sample region ($N_o$=2), there are four check period peak frequencies ($f_{chk,1}$, $f_{chk,2}$, and $f_{chk,3}$, and $f_{chk,4}$).

The LIDAR data validator 276 can use the check data period associated with a sample region to identify which of the candidate LIDAR data values associated with that sample region are correct. For instance, the LIDAR data validator 276 can calculate a comparative check period beat frequencies ($cf_{chk,i'}$) for each candidate frequency pair from the candidate LIDAR data associated with the candidate frequency pair $P_{i'}$. A comparative check period beat frequency ($cf_{chk}$) can be determined by substituting the rate of frequency change during the check data period $\alpha_{chk}$ into Equation 1 to provide Equation 4:

$$cf_{chk} = 2\alpha_{chk} R/c - 2v/\lambda.$$

When the system output signal has a frequency versus time pattern according to FIG. 5C, the data periods labeled $DP_3$ can serve as check data periods. As a result, the value of $\alpha_3$ can serve as $\alpha_{chk}$. The LIDAR data validator 276 can calculate the comparative check period beat frequency for the candidate frequency pair $P_{i'}$ from Equation 5:

$$cf_{chk,i'} = 2\alpha_{chk} R_i/c - 2v_{i'}/\lambda \text{ where } R_{i'}$$

represents the candidate distance for the candidate frequency pair $P_{i'}$ and $v_{i'}$ represents the candidate radial velocity for the candidate frequency pair $P_{i'}$.

The LIDAR data validator 276 can use the comparative check period beat frequency for the candidate frequency pairs ($cf_{chk,i'}$) to identify the $N_o$ valid candidate frequency pairs (the valid frequency pair(s)) and accordingly, the LIDAR data for the one or more valid frequency pairs. For instance, the LIDAR data validator 276 can apply one or more check criteria to each candidate frequency pair $P_{i'}$. As an example, the LIDAR data validator 276 can compare the values of the $2N_o$ check period beat frequencies ($f_{chk,n}$) and the comparative check period beat frequencies ($cf_{chk,i'}$) from the same sample region so as to identify matching values. As a more specific example, in some instances, the matches are identified by comparing the value of each of the check period beat frequencies ($f_{chk,n}$) for calculated for a sample region to the value of one of the comparative check period beat frequencies ($cf_{chk,i'}$) calculated for the region where one of the comparisons is made for each of the comparative check period beat frequencies ($cf_{chk,i'}$) calculated for the sample region. For instance, the LIDAR data validator 276 can subtract each of the check data period ($f_{chk,n}$) values from each of the comparative check period beat frequencies ($cf_{chk,i'}$) to generate match indicators. The number of match indicators can be equal to $2N_o*(2(N_o))^2$. The LIDAR data validator 276 can identify the $N_o$ match indicators with the smallest absolute values. As an example, the LIDAR data validator 276 can calculate a value for match indicator $X_{i'n}=|cf_{chk,i'}-f_{chk,n}|$ for all values of i' from 1 to $(2(N_o))^2$ and all values of n from 1 to $2N_o$. The LIDAR data validator 276 can identify $N_o$ of the $X_{i',n}$ results with the smallest values as the matching values. Matching values indicate a match between the beat frequency that is estimated for a check data period from the data for a candidate pair ($cf_{chk,i'}$) and one of the actually measured beat frequencies ($f_{chk,n}$). Each of the values of i' for the $N_o$ identified match indicators indicates the candidate frequency pairs $P_{i'}$ that is associated with one of the objects in the sample region. For instance, when LIDAR data validator 276 identifies the match indicators $X_{5,3}$ and $X_{9,1}$, the candidate frequency pairs associated with i'=5 and i'=9 are identified as a valid frequency pair for the sample region m, i.e. $P_5=(f_{m,n}, f_{m,n})$ and $P_9=(f_{m,n}, f_{m,n})$. Accordingly, the peak frequencies in each of the identified candidate pairs $P_{i'}$ are identified as representing valid beat frequencies that occurring during the subject data periods and as being produced by the same object in the sample region. For instance, if the candidate frequency pair $P_5=(f_{1,1}, f_{2,4})$ is identified, the peak frequencies $f_{1,1}$ and $f_{2,4}$ are identified as representing the actual beat frequencies that occur during the subject data periods m=1 and m=2 and resulting from reflection of the system output signal by the same object in the sample region. Similarly, the candidate LIDAR data associated with the identified i' values is also assigned to serve as the LIDAR data for sample region m. For instance, the sample region is treated as containing an object at distance $R_5$ with radial velocity vs and an object at distance $R_9$ with radial velocity $v_9$. The LIDAR data validator 276 can discard frequency pairs having pair indices (i') that are associated with the match indicators that are not identified by the LIDAR data validator 276. Similarly, the LIDAR data validator 276 can discard LIDAR data ($R_{i'}$ and/or $v_{i'}$) associated with the match indicators that are not identified by the LIDAR data validator 276. The LIDAR data validator 276 can execute the attributed functions using firmware, hardware or software or a combination thereof.

The comparative check period beat frequencies ($cf_{chk,i'}$) are each an approximation of the value of one of the check period beat frequencies ($f_{chk,n}$) but rather than being a function of the value of the beat frequency in the check period, the comparative check period beat frequencies ($cf_{chk,i'}$) are a function of the beat frequencies from multiple different subject data periods. The comparative beat frequency for each candidate frequency pair represents a value that the beat frequency associated with the check data period would have if the first subject beat frequency were equal to the candidate frequency from the first subject data period in the candidate frequency pair and the second subject beat frequency were equal to the candidate frequency from the second subject data period in the candidate frequency pair. The comparative check period beat frequencies ($cf_{chk,i'}$) are each calculated from the beat frequencies in multiple different subject data periods. For instance, in the above examples, the comparative check period beat frequencies ($cf_{chk,i'}$) are calculated from the beat frequencies during an increasing subject data period and a decreasing subject data period. As a result, the comparative check period beat frequencies ($cf_{chk,i'}$) are a function of the distance (R) and radial velocity (v) values during data periods other than the check data period. In contrast, the check period beat frequencies ($f_{chk,n}$) are a function of the distance (R) and radial velocity (v) values during the check data period. Accordingly, the values of each check period beat frequency ($f_{chk,n}$) matches the value of one of the comparative check period beat frequencies ($cf_{chk,i'}$) when the distance (R) and radial velocity (v) values match during both the check data period and the associated subject data periods. For instance, the values of each check period beat frequency ($f_{chk,n}$) matches the value of one of the comparative check period beat frequencies ($cf_{chk,i'}$) when the distance (R) and radial velocity (v) remain constant or substantially constant during the check data period, the associated increasing data period, and the associated decreasing data period. The comparative check period beat frequencies ($cf_{chk,i'}$) that do not result in matches and the associated candidate LIDAR data are discarded.

Figure 6:
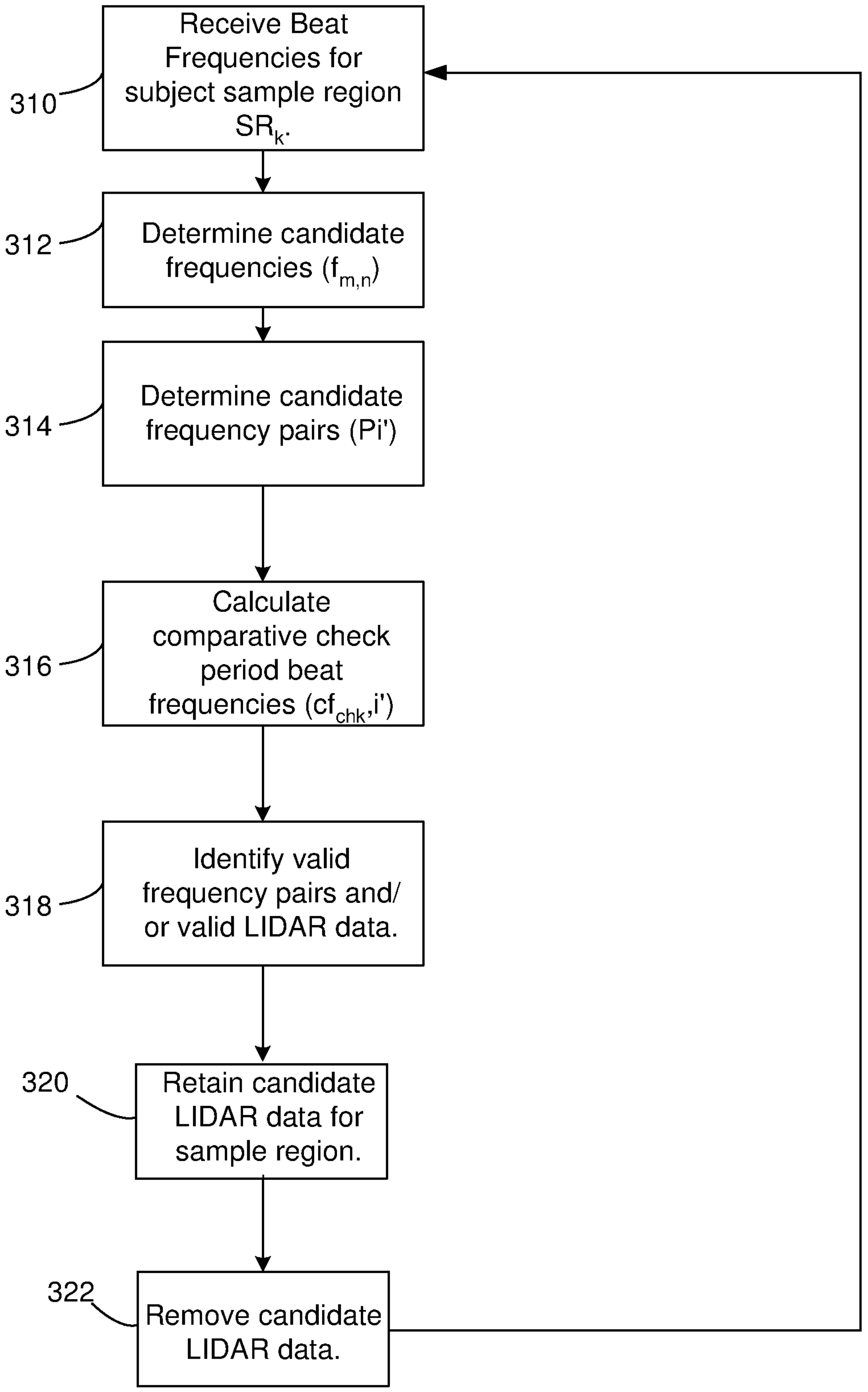
FIG. 6 illustrates a flow diagram for a LIDAR data refinement process.

FIG. 6 is a flow diagram for a LIDAR data refinement process that can be used to identify valid LIDAR data. At process block 310, the beat frequencies are received for a subject one of the sample regions ($SR_k$). For instance, the LIDAR data generator 274 can receive the beat frequencies from the memory 271 and/or peak finder 270. As noted above, the received beat frequencies include beat frequencies from two or more subject data periods and at least one check data period. For instance, when the system output signal has a frequency versus time pattern according to FIG. 5C, the received beat frequencies can include the beat frequencies that result from the system output signal during data periods $DP_1$, $DP_2$, and $DP_3$ of the subject sample region $SR_k$. In some instance, $DP_1$ and $DP_2$ can serve as subject data periods and $DP_3$ can serve as a check data period. As another example, $DP_1$ and $DP_3$ can serve as subject data periods and $DP_2$ can serve as a check data period.

At process block 312, the LIDAR data generator can identify a set of candidate frequencies ($f_{m,n}$). A set of candidate frequencies ($f_{m,n}$) can be determined for each data period associated with the sample region $SR_k$. For instance, if the system output signal has a frequency versus time pattern according to FIG. 5C, a set of first candidate frequencies can be identified that includes one or more first target frequencies that are each at a first subject beat frequency and one or more first image frequencies that are each at the additive inverse of one of the first subject beat frequencies; a set of second candidate frequencies can be identified that includes one or more second target frequencies that are each at a second subject beat frequency and one or more second image frequencies that are each at an additive inverse of one of the second subject beat frequency; and a set of check candidate frequencies can be identified that includes one or more check target frequencies that are each at a check beat frequency and one or more check image frequencies that are each at the additive inverse of one of the check beat frequencies.

In order to find a set of candidate frequencies ($f_{m,n}$), a peak finder 270 can search the whole frequency spectrum for frequency peaks. Alternately, the peak finder 270 can search the positive side of the frequency spectrum (>DC) or the negative side of the frequency spectrum. When the peak finder 270 searches the positive side of the frequency spectrum (>DC) or the negative side of the frequency spectrum, the peak finder identifies $N_o$ frequencies but does not identify the corresponding frequencies. As a result, the LIDAR data generator 274 can receive only a portion of the candidate frequencies ($f_{m,n}$) for the sample region $SR_k$. When the LIDAR data generator 274 receives only a portion of the candidate frequencies ($f_{m,n}$) for the sample region $SR_k$, the LIDAR data generator 274 can add the corresponding frequencies to the received candidate frequencies ($f_{m,n}$) to identify the full set of candidate frequencies ($f_{m,n}$) for the sample region $SR_k$. When the peak finder 270 searches the whole frequency spectrum for frequency peaks, the received candidate frequencies ($f_{m,n}$) can serve as the full set of candidate frequencies ($f_{m,n}$) for the sample region $SR_k$.

At process block 314, the LIDAR data generator 274 can identify the candidate frequency pairs from the candidate frequencies identified at process block 312.

At process block 316, the LIDAR data generator 274 can calculate a comparative check period beat frequency for each of the candidate frequency pairs. In some instances, the LIDAR data generator 274 also calculates the candidate LIDAR data for each of the candidate frequency pairs. For instance, the LIDAR data generator 274 can use Equation 2 and/or Equation 3 to calculate a candidate distance ($R_{i'}$) and/or a candidate radial velocity ($v_{i'}$). The candidate distance and/or candidate radial velocity ($R_{i'}$ and/or $v_{i'}$) are calculated for each of the candidate frequency pairs $P_{i'}$. When the LIDAR data generator 274 calculates a candidate distance and/or a candidate radial velocity ($R_{i'}$ and/or $v_{i'}$) for each of the candidate frequency pairs $P_{i'}$, the comparative check period beat frequency for each of the candidate frequency pairs $P_{i'}$ ($cf_{chk,i'}$) can be calculated from Equation 5. When the LIDAR data generator 274 does not calculate a candidate distance and candidate radial velocity ($R_{i'}$ and/or $v_{i'}$) for each of the candidate frequency pairs $P_{i'}$, the comparative check period beat frequency for each of the candidate frequency pairs $P_{i'}$ ($cf_{chk,i'}$) can be calculated directly from the values of $f_{ub}$ and $f_{db}$ by substituting Equations 2 and 3 into Equation 5.

At process block 318, the LIDAR data validator 276 identifies the valid frequency pairs and/or valid LIDAR data for the sample region. For instance, the LIDAR data validator 276 can apply one or more check criteria to each candidate frequency pair $P_{i'}$ so as to identify the valid frequency pairs and/or valid LIDAR data. In one example, the LIDAR data validator 276 calculate a value for match indicator $X_{i',n}=|cf_{chk,i'}-f_{chk,n}|$ for all values of i' from 1 to $(2(N_o))^2$ and all values of n from 1 to $2N_o$. The LIDAR data validator 276 identifies $N_o$ of the $X_{i',n}$ results with the smallest values as matching values. The $N_o$ values of i' for the identified match indicators belong to the valid candidate frequency pairs $P_{i'}$ (valid frequency pairs). In some instances, the LIDAR data validator 276 identifies the valid LIDAR data at process block 318. For instance, the candidate LIDAR data associated with the identified i' values is identified as the valid LIDAR data for sample region m. For instance, the sample region is treated as containing an object at distance $R_i$ and/or having radial velocity $v_i$ for each of the identified i' values. Accordingly, when the LIDAR data generator 274 calculated candidate LIDAR data for each of the candidate frequency pairs at process block 316, the candidate LIDAR data associated with the identified i' values can serve as the valid LIDAR data for the sample region. For instance, when the LIDAR data generator 274 calculated, at process block 316, a candidate distance and/or a candidate radial velocity ($R_{i'}$ and/or $v_{i'}$) for each of the candidate frequency pairs $P_{i'}$ the candidate distance ($R_{i'}$) values for each of the identified i' values and/or the candidate radial velocity ($v_{i'}$) values for each of the identified i' values can serve as the valid distance ($R_{i'}$) value(s) and/or the valid radial velocity ($v_{i'}$) value(s) for the one or more objects in the sample region. When the sample region includes more than one object, the valid distance ($R_{i'}$) and valid radial velocity ($v_{i'}$) value having the same i' index value are for the same object. As a result, the LIDAR data for each of the different objects in the sample region can be identified. Since the valid LIDAR data are associated with the identified i' value, identifying the valid LIDAR data also identifies the valid frequency pairs by identifying which one of the candidate LIDAR data results was calculated from the candidate frequency pair that included the first target frequency and the second target frequency associated with the same object.

When the LIDAR data generator 274 did not calculate candidate LIDAR data for each of the candidate frequency pairs at process block 316, the LIDAR data validator 276 can use the identified i' values to calculate the valid LIDAR data for the sample region. For instance, the LIDAR data validator 276 can use Equation 2 and/or Equation 3 to calculate a valid distance and/or a valid radial velocity ($R_{i'}$ and/or $v_{i'}$) for each of the identified i' values. When the sample region includes more than one object, the valid distance ($R_{i'}$) and valid radial velocity ($v_{i'}$) value having the same i' index value correspond to the same object. As a result, the LIDAR data for each of the different objects in the sample region can be identified.

At process block 320, the LIDAR data validator 276 can retain the valid LIDAR data for the sample region and/or make available to an application for further processing. For instance, the valid LIDAR data for the sample region can be stored in a storage device such as a memory and/or can be processed further. In some instances, further processing includes screening the valid LIDAR data for errors. After further processing, the screened LIDAR data for the sample region can be stored in a storage device such as a memory and/or can be processed further. An application can access the valid and/or screened LIDAR data for the sample region from a storage device or directly from the electronics 32. At process block 320, the LIDAR data validator 276 can optionally discard and/or flag as invalid any candidate frequency pairs and/or candidate LIDAR data for the sample region. As a result, a first portion of the candidate frequency pairs and/or candidate LIDAR data is classified as valid while a second portion of the candidate frequency pairs and/or candidate LIDAR data is classified as invalid.

Although the LIDAR system is disclosed as having a system output signal with a frequency versus time pattern that includes two subject data periods per sample region, the system output signal can have a frequency versus time pattern with a single subject data period. For instance, for fields of view that are stationary have a radial velocity equal to zero for each of the sample regions. As a result, the range (R) can be resolved with a single subject data period. In these instances, the candidate frequencies for the subject data period can serve as the candidate frequency pairs, $f_{db}$ or $f_{ub}$ can be set to zero depending on the frequency versus time pattern, and the value of $v_{i'}$ can be set to zero in the above equations.

Although the LIDAR system is described as generating a composite signal with multiple different beat frequencies when multiple objects are present in a sample regions and/or illuminated by the system output signal. However, a composite signal with multiple different beat frequencies can also result from different surfaces of the same physical entity. As a result, multiple objects being present in a sample regions and/or illuminated by a system output signal can also include multiple surfaces of the same physical entity.

Suitable electronics 32 can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. In some instances, the functions of the LIDAR data generator and the peak finder can be executed by Field Programmable Gate Arrays (FPGAs), digital signal processors (DSPs), Application Specific Integrated Circuits, firmware, software, hardware, and combinations thereof. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Figure 7:
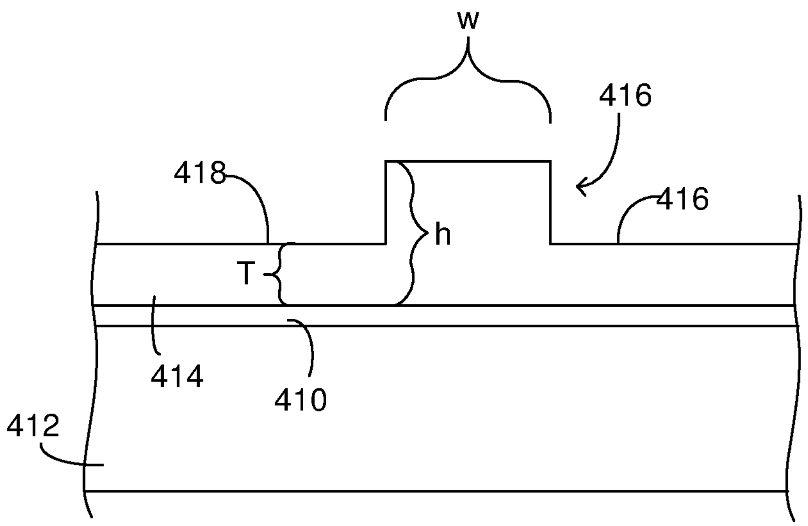
FIG. 7 is a cross-section of portion of a LIDAR chip that includes a waveguide on a silicon-on-insulator platform.

Suitable platforms for the LIDAR chips include, but are not limited to, silica, indium phosphide, and silicon-on-insulator wafers. FIG. 7 is a cross-section of portion of a chip constructed from a silicon-on-insulator wafer. A silicon-on-insulator (SOI) wafer includes a buried layer 410 between a substrate 412 and a light-transmitting medium 414. In a silicon-on-insulator wafer, the buried layer 410 is silica while the substrate 412 and the light-transmitting medium 414 are silicon. The substrate 412 of an optical platform such as an SOI wafer can serve as the base for the entire LIDAR chip. For instance, the optical components shown on the LIDAR chips of FIG. 1A through FIG. 1C can be positioned on or over the top and/or lateral sides of the substrate 412.

The portion of the chip illustrated in FIG. 7 includes a waveguide construction that is suitable for use in LIDAR chips constructed from silicon-on-insulator wafers. A ridge 416 of the light-transmitting medium 414 extends away from slab regions 418 of the light-transmitting medium. The light signals are constrained between the top of the ridge 416 and the buried oxide layer 410.

The dimensions of the ridge waveguide are labeled in FIG. 7. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multimode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 7 is suitable for all or a portion of the waveguides on LIDAR chips constructed according to FIG. 1A through FIG. 1C.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first auxiliary light sensor 218, the second auxiliary light sensor 220, the first light sensor 223, and the second light sensor 224.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,472, issued on Aug. 22, 2000 each of which is incorporated herein in its entirety. The use of light sensors that are integrated with the chip are suitable for all or a portion of the light sensors selected from the group consisting of the auxiliary light sensor 218, the second auxiliary light sensor 220, the first light sensor 223, and the second light sensor 224.

The light source 4 that is interfaced with the utility waveguide 12 can be a laser chip that is separate from the LIDAR chip and then attached to the LIDAR chip. For instance, the light source 4 can be a laser chip that is attached to the chip using a flip-chip arrangement. Use of flip-chip arrangements is suitable when the light source 4 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the light source 4 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. When the light source 4 is a gain element or laser chip, the electronics 32 can change the frequency of the outgoing LIDAR signal by changing the level of electrical current applied to through the gain element or laser cavity.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demultiplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demultiplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of operating a LIDAR system, comprising:

transmitting a system output signal from the LIDAR system such that a sample region is illuminated by the system output signal, different portions of the system output signal are transmitted during different data periods, one of the data periods serving as a check data period;

combining light that returns to the LIDAR system from the system output signal with light from a reference signal so as to generate beating signals that are each associated with a different one of the data periods;

generating multiple candidate frequencies for each of the data periods, each of the candidate frequencies for a data period representing a possible beat frequency for the beating signal associated with the data period; and using the candidate frequencies for the check data period to identify which of the candidate frequencies for a subject one of the data periods is at the beat frequency for the beating signal associated with the subject data period.

2. The method of claim 1, further comprising: calculating LIDAR data for an object in the sample region from the identified subject target frequency, the LIDAR data indicating a radial velocity and/or a distance between the LIDAR system and the object.

3. The method of claim 2, wherein the LIDAR data for the object is not a function of any of the candidate frequencies for the subject data period that are not identified as being at the beat frequency for the beating signal.

4. The method of claim 1, further comprising identifying multiple candidate frequency pairs, each candidate frequency pair including one of the candidate frequencies from the subject data period and one of the second candidate frequencies from a second subject one of the data periods, and wherein using the candidate frequencies from the check data period to identify which one of the candidate frequencies associated the subject data period is at the beat frequency of the beating signal associated with the subject data period includes identifying which one of the candidate frequency pairs includes the beat frequency for the beating signal associated with the subject data period paired with the beat frequency for the beating signal associated with the second subject data period.

5. The method of claim 4, further comprising:

calculating a comparative beat frequency for each one of the candidate frequency pairs, the comparative beat frequency for each candidate frequency pair being calculated from the candidate frequency from the subject data period in the candidate frequency pair and from the candidate frequency from the second subject data period in the candidate frequency pair, the comparative beat frequency for each one of the candidate frequency pairs representing a value that the beat frequency associated with the check data period would have if the beat frequency associated with the subject data period were equal to the candidate frequency from the subject data period in the candidate frequency pair and the beat frequency associated with the second subject data period were equal to the candidate frequency from the second subject data period in the candidate frequency pair.

6. The method of claim 5, wherein identifying which one of the candidate frequency pairs includes the beat frequency for the beating signal associated with the subject data period paired with the beat frequency for the beating signal associated with the second subject data period includes comparing the candidate the candidate frequencies for the check data period to the comparative beat frequency for each one of the candidate frequency pairs.

7. The method of claim 1, wherein a subject portion of the system output signal is transmitted during the subject data period, and a check portion of the system output signal is transmitted during the check data period, a frequency of the system output signal changing at different rates during the subject data period and the check data period;

wherein combining the light that returns to the LIDAR system from the system output signal with light from a reference signal includes combining light that returns to the LIDAR system from the subject portion of the system output signal with light from a subject reference signal so as to generate a subject beating signal beating at a subject beat frequency, and combining light that returns to the LIDAR system from the check portion of the system output signal with light from a check reference signal so as to generate a check beating signal beating at a check beat frequency;

generating the candidate frequencies for each of the data periods includes generating subject candidate frequencies that include a subject target frequency at the subject beat frequency and a subject image frequency at the additive inverse of the subject beat frequency, and generating check candidate frequencies that include a check target frequency at the check beat frequency and a check image frequency at the additive inverse of the check beat frequency; and using the candidate frequencies includes using the check candidate frequencies to identify which one of the subject candidate frequencies is the subject target frequency.

8. The method of claim 1, wherein each of the candidate frequencies is at a frequency peak in an output spectrum from a real Fast Fourier Transform (FFT).

9. A method of operating a LIDAR system, comprising:

transmitting from the LIDAR system a system output signal such that a sample region is illuminated by the system output signal, different portions of the system output signal are transmitted during different data periods a first subject portion of the system output signal being transmitted during a first subject one of the data periods, a second subject portion of the system output signal being transmitted during a second subject one of the data periods, and a check portion of the system output signal being transmitted during one of the data periods that serves as a check data period, a frequency of the system output signal changing at different rates during the first subject data period and the second subject data period;

combining light that returns to the LIDAR system from the first subject portion of the system output signal with light from a first subject portion of a reference signal so as to generate a first subject beating signal beating at a first subject beat frequency, combining light that returns to the LIDAR system from the second subject portion of the system output signal with light from a second subject portion of the reference signal so as to generate a second subject beating signal beating at a second subject beat frequency, combining light that returns to the LIDAR system from the check portion of the system output signal with light from a check reference signal so as to generate a check beating signal beating at a check beat frequency, identifying multiple first subject candidate frequencies, the first candidate frequencies including a first target frequency at the first subject beat frequency and a first image frequency at the additive inverse of the first subject beat frequency, identifying multiple second candidate frequencies, the second candidate frequencies including a second target frequency at the second subject beat frequency and a second image frequency at the additive inverse of the second subject beat frequency, identifying multiple check candidate frequencies, the check candidate frequencies including a check target frequency at the check beat frequency and a check image frequency at the additive inverse of the check beat frequency;

identifying multiple candidate frequency pairs, each candidate frequency pair including one of the first candidate frequencies and one of the second candidate frequencies;

calculating multiple different candidate LIDAR data results for the sample region, each of the different candidate LIDAR data results being a candidate for a radial velocity and/or a distance between the LIDAR system and an object in the sample region, wherein calculating multiple different candidate LIDAR data results for the sample region includes calculating the candidate LIDAR data results from each one of the candidate frequency pairs; and identifying which one of the candidate LIDAR data results represents valid LIDAR data for the sample region, wherein identifying which one of the candidate LIDAR data results represents valid LIDAR data for the sample region includes identifying which one of the candidate LIDAR data results was calculated from the first target frequency and the second target frequency.

10. The method of claim 9, wherein the candidate frequency pairs are identified such that there is one of the candidate frequency pairs for each possible combination of one of the first candidate frequencies paired with one of the second candidate frequencies.

11. The method of claim 9, wherein the LIDAR data result for each of the candidate frequency pairs is a candidate for the radial velocity and the distance between the LIDAR system and the object in the sample region.

12. The method of claim 9, further comprising:

calculating a comparative beat frequency for each one of the candidate frequency pairs, the comparative beat frequency for each candidate frequency pair being calculated from the first candidate frequency and the second candidate frequency in the candidate frequency pair, the comparative beat frequency for each one of the candidate frequency pairs being an approximation of a value that the third target frequency would have if the first target frequency were equal to the first candidate frequency in the candidate frequency pair and the second target frequency were equal to the second candidate frequency in the candidate frequency pair.

13. The method of claim 12, wherein identifying which one of the candidate LIDAR data results was calculated from the candidate frequency pair that included the first target frequency and the second target frequency includes comparing the third target frequencies to the comparative beat frequency for each one of the candidate frequency pairs.

14. The method of claim 13, further comprising: calculating match indicators that are each an absolute value of a difference between one of the comparative beat frequency and one of the third target frequencies, one of the match indicators being calculated for each possible combination of one of the comparative beat frequency with one of the third target frequencies, and the candidate LIDAR data results calculated from the candidate frequency pair associated with the lowest match indicator being identified as the candidate LIDAR data results calculated from the first target frequency and the second target frequency.

15. A system, comprising:

A LIDAR system configured to transmit a system output signal from the LIDAR system such that a sample region is illuminated by the system output signal, different portions of the system output signal being transmitted during different data periods, one of the data periods serving as a check data period;

a light signal combiner configured to combine light that returns to the LIDAR system from the system output signal with light from a reference signal so as to generate beating signals that are each associated with a different one of the data periods;

electronics configured to generates multiple candidate frequencies for each of the data periods, each of the candidate frequencies for a data period representing a possible beat frequency for the beating signal associated with the data period, and the electronics using the candidate frequencies for the check data period to identify which of the candidate frequencies for a subject one of the data periods is at the beat frequency for the beating signal associated with the subject data period.

16. The system of claim 15, wherein the electronics calculate LIDAR data for an object in the sample region from the identified subject target frequency, the LIDAR data indicating a radial velocity and/or a distance between the LIDAR system and the object; and the LIDAR data for the object is not a function of any of the candidate frequencies for the subject data period that are not identified as being at the beat frequency for the beating signal.

17. The system of claim 15, wherein a subject portion of the system output signal is transmitted during the subject data period, and a check portion of the system output signal is transmitted during a check one of the data periods that serves as a check data period, a frequency of the system output signal changes at different rates during the subject data period and the check data period;

the light signal combiner is configured to combine the light that returns to the LIDAR system from the system output signal with light from a reference signal such that the light that returns to the LIDAR system from the subject portion of the system output signal is combined with light from a subject portion of the reference signal so as to generate a subject beating signal beating at a subject beat frequency, and the light that returns to the LIDAR system from the check portion of the system output signal is combined with light from a check portion of the reference signal so as to generate a check beating signal beating at a check beat frequency;

the candidate frequencies to include subject candidate frequencies and check candidate frequencies, the subject candidate frequencies include a subject target frequency at the subject beat frequency and a subject image frequency at the additive inverse of the subject beat frequency, and the check candidate frequencies include a check target frequency at the check beat frequency and a check image frequency at the additive inverse of the check beat frequency; and the electronics using the candidate frequencies includes using the check candidate frequencies to identify which one of the subject candidate frequencies is the subject target frequency.

18. A system, comprising:

a LIDAR system configured to transmit a system output signal such that a sample region is illuminated by the system output signal, different portions of the system output signal being transmitted during different data periods, a subject portion of the system output signal being transmitted during a first subject one of the data periods, a second subject portion of the system output signal being transmitted during a second subject one of the data periods and a check portion of the system output signal being transmitted during one of the data periods that serves as a check data period, a frequency of the system output signal changing at different rates during the first subject data period and the second subject data period;

a light signal combiner that combines light that returns to the LIDAR system from the first subject portion of the system output signal with light from a first subject portion of a reference signal so as to generate a first subject beating signal beating at a first subject beat frequency, the light signal combiner combining light that returns to the LIDAR system from the second subject portion of the system output signal with light from a second subject portion of the reference signal so as to generate a second subject beating signal beating at a second subject beat frequency, the light signal combiner combining light that returns to the LIDAR system from the check portion of the system output signal with light from a check portion of the reference signal so as to generate a check beating signal beating at a check beat frequency;

electronics that calculate multiple different candidate LIDAR data results for the sample region, each of the different candidate LIDAR data results being a candidate for a radial velocity and/or a distance between the LIDAR system and an object in the sample region, the electronics identifying which one of the candidate LIDAR data results represents valid LIDAR data for the sample region, wherein identifying which one of the candidate LIDAR data results represents valid LIDAR data for the sample region includes identifying multiple first candidate frequencies, multiple second candidate frequencies, and multiple check candidate frequencies, the first candidate frequencies including a first target frequency at the first subject beat frequency and a first image frequency at the additive inverse of the first subject beat frequency, the second candidate frequencies including a second target frequency at the second beat frequency and a second image frequency at the additive inverse of the second beat frequency, and the third candidate frequencies including a third target frequency at the third beat frequency and a third image frequency at the additive inverse of the third beat frequency; and wherein identifying which one of the candidate LIDAR data results represents valid LIDAR data for the sample region includes identifying multiple candidate frequency pairs, each candidate frequency pair including one of the first candidate frequencies and one of the second candidate frequencies;

calculating multiple different candidate LIDAR data results for the sample region includes calculating the candidate LIDAR data results from each one of the candidate frequency pairs; and wherein identifying which one of the candidate LIDAR data results represents valid LIDAR data for the sample region includes identifying which one of the candidate LIDAR data results was calculated from the first target frequency and the second target frequency.

* * * * *